(12) United States Patent
Pridham

(10) Patent No.: US 10,246,868 B2
(45) Date of Patent: Apr. 2, 2019

(54) MODULAR PLATFORM ASSEMBLY AND A METHOD OF ASSEMBLING A MODULAR PLATFORM

(71) Applicant: Andrew Pridham, Minto (AU)

(72) Inventor: Andrew Pridham, Minto (AU)

(*) Notice: Subject to any disclaimer, the term of this patent is extended or adjusted under 35 U.S.C. 154(b) by 0 days.

(21) Appl. No.: 15/531,042

(22) PCT Filed: Nov. 23, 2015

(86) PCT No.: PCT/AU2015/000705
§ 371 (c)(1),
(2) Date: May 26, 2017

(87) PCT Pub. No.: WO2016/081974
PCT Pub. Date: Jun. 2, 2016

(65) Prior Publication Data
US 2017/0321413 A1   Nov. 9, 2017

(30) Foreign Application Priority Data

Nov. 26, 2014  (AU) ............................... 2014101401

(51) Int. Cl.
*E04B 1/24*        (2006.01)
*E04D 13/12*    (2006.01)
(Continued)

(52) U.S. Cl.
CPC .......... *E04B 1/2403* (2013.01); *E04B 1/2604* (2013.01); *E04B 1/2608* (2013.01);
(Continued)

(58) Field of Classification Search
CPC ......... Y10T 403/7194; Y10T 403/7105; E04B 1/2403; E04B 2001/2457;
(Continued)

(56) References Cited

U.S. PATENT DOCUMENTS 666,918 A * 1/1901 Butz ..................... F16B 7/0446
248/300
760,512 A * 5/1904 Alschuler ............. E04B 1/2403
256/DIG. 4
(Continued)

FOREIGN PATENT DOCUMENTS

CA    2 843 797 A1    8/2015
CN    202 596 117 U    12/2012
(Continued)

OTHER PUBLICATIONS

PCT Search Report, dated Dec. 8, 2015.
(Continued)

*Primary Examiner* — Robert Canfield
*Assistant Examiner* — Matthew J Gitlin
(74) *Attorney, Agent, or Firm* — Dority & Manning, P.A.

(57) ABSTRACT

There is disclosed a modular platform assembly including a plurality of legs (18), a plurality of floor beams (20*a,b,c*), and a plurality of connectors (24*a,b,c,d*) for connecting the legs (18) and the floor beams (20*a,b,c*). Each said connector (24*a,b,c,d*) comprises: a downwardly open blind recess (59) with a closed top end (60) and an open bottom end (62); and an upwardly open blind recess (64) with a closed bottom end (66) and an open top end (68). The legs (18) are mounted into the downwardly open blind recesses (59) of the connectors (24*a,b,c,d*) and the floor beams (20*a,b,c*) are mounted into the upwardly open blind recesses (64) of the connectors (24*a,b,c,d*) such that the legs (18) extend downwardly from the floor beams (20*a,b,c*).

18 Claims, 18 Drawing Sheets

(51) Int. Cl.
| | |
|---|---|
| *F24F 13/32* | (2006.01) |
| *E04F 15/02* | (2006.01) |
| *E04F 15/06* | (2006.01) |
| *E04B 1/26* | (2006.01) |
| *E04B 1/41* | (2006.01) |
| *E04B 5/14* | (2006.01) |
| *E04G 21/32* | (2006.01) |
| *E04G 3/26* | (2006.01) |

(52) U.S. Cl.
CPC ............... *E04B 1/40* (2013.01); *E04B 5/14* (2013.01); *E04D 13/12* (2013.01); *E04F 15/02044* (2013.01); *E04F 15/02183* (2013.01); *E04F 15/06* (2013.01); *E04G 21/32* (2013.01); *F24F 13/32* (2013.01); *E04B 2001/2421* (2013.01); *E04B 2001/2451* (2013.01); *E04B 2001/2457* (2013.01); *E04F 2015/02061* (2013.01); *E04G 3/26* (2013.01); *Y10T 403/7105* (2015.01); *Y10T 403/7194* (2015.01)

(58) Field of Classification Search
CPC ..... E04B 2001/2451; E04B 2001/2421; E04B 1/0007; E04B 1/2604; E04B 1/2608; E04B 1/2612; E04B 5/14; E04F 15/02183; E04F 15/56; E04G 21/32; E04G 21/3223
USPC ........ 52/283, 301, 702, 126.5, 126.6, 173.3, 52/263, 289, 480, 650.3, 299, 300; 403/173, 230
See application file for complete search history.

(56) References Cited

U.S. PATENT DOCUMENTS

| | | | | | |
|---|---|---|---|---|---|
| 915,074 | A * | 3/1909 | Craig | ............... | E04B 1/2403 403/173 |
| 963,585 | A * | 7/1910 | Kimball | ............... | F16B 12/2009 403/231 |
| 2,646,285 | A * | 7/1953 | Snyder | ............... | E04B 1/34336 280/27 |
| 3,924,370 | A | 12/1975 | Cauceglia et al. | | |
| 3,945,741 | A * | 3/1976 | Wendt | ............... | E04B 1/5818 403/191 |
| 4,027,987 | A * | 6/1977 | Berkowitz | ............ | F16B 7/0446 403/172 |
| 4,313,688 | A * | 2/1982 | Daniels | ............... | E04B 1/2608 403/189 |
| 4,318,628 | A * | 3/1982 | Mancini | ............ | A47B 47/0033 403/231 |
| 4,422,792 | A * | 12/1983 | Gilb | ............... | E04B 1/2612 403/232.1 |
| 5,104,252 | A * | 4/1992 | Colonias | ............... | E04B 1/2612 403/230 |
| 5,274,967 | A * | 1/1994 | Mladichek | ............... | E04B 7/02 52/126.1 |
| 5,367,853 | A * | 11/1994 | Bryan | ............... | E04B 5/12 52/289 |
| 5,371,985 | A * | 12/1994 | Suttles | ............... | A47F 5/101 52/126.1 |
| D370,681 | S * | 6/1996 | Diamond | ............... | D14/252 |
| 7,310,914 | B1 * | 12/2007 | Moore | ............... | E04B 1/3483 52/289 |
| 7,493,738 | B2 * | 2/2009 | Bui | ............... | E04C 2/06 52/578 |
| 8,061,106 | B2 * | 11/2011 | Clark | ............... | E04F 10/08 52/650.1 |
| 8,225,575 | B2 * | 7/2012 | Gadd | ............... | E04B 1/2612 52/289 |
| 2003/0033767 | A1 * | 2/2003 | Mead | ............... | B29C 65/7802 52/263 |
| 2004/0129845 | A1 * | 7/2004 | Whale | ............... | E04B 1/2612 248/201 |
| 2006/0265992 | A1 * | 11/2006 | Hiragaki | ............... | E04B 1/2403 52/633 |
| 2007/0119108 | A1 * | 5/2007 | Downard | ............... | E04B 1/2604 52/289 |
| 2015/0152630 | A1 * | 6/2015 | Winter | ............... | E04F 15/02044 52/633 |
| 2015/0337528 | A1 * | 11/2015 | Brandt | ............... | E04F 15/02044 52/483.1 |

FOREIGN PATENT DOCUMENTS

| | | |
|---|---|---|
| DE | 39 18 240 A1 | 10/1990 |
| DE | 40 27 137 A1 | 3/1992 |
| GB | 2 358 881 B | 8/2003 |
| WO | WO 03/091514 A1 | 11/2003 |
| WO | WO 2006/059058 | 6/2006 |

OTHER PUBLICATIONS

Simpson Strong Tie Wood Construction Connectors 2009-2010, (Jan. 18, 2010), pp. 56, 70, 77, 93, 94, 113-114, 122, 139, 187, URL: http://www.who-sells- it.com/cy/simpson-strong-tie-793/wood-construction-connectors-2009-2010- 20720.html, (Mar. 6, 2015), [X] 1-18 as per Wayback Machine pp. 56, 70, 77, 93, 94, 113, 114, 122, 139, 187.
Deck Unit, (Jan. 3, 2013), URL: http://teachers.colonelby.com/skutschke/TDJ3M/DECK%20WEBSITE/Decks.html, (Mar. 6, 2015), [A] 1-18 as per Wayback Machine Tabs—Overall Pictures, Beams, Calculation Table.
Australian Examination Report, Mar. 13, 2015.
EPO Search Report, Jun. 13, 2018.

\* cited by examiner

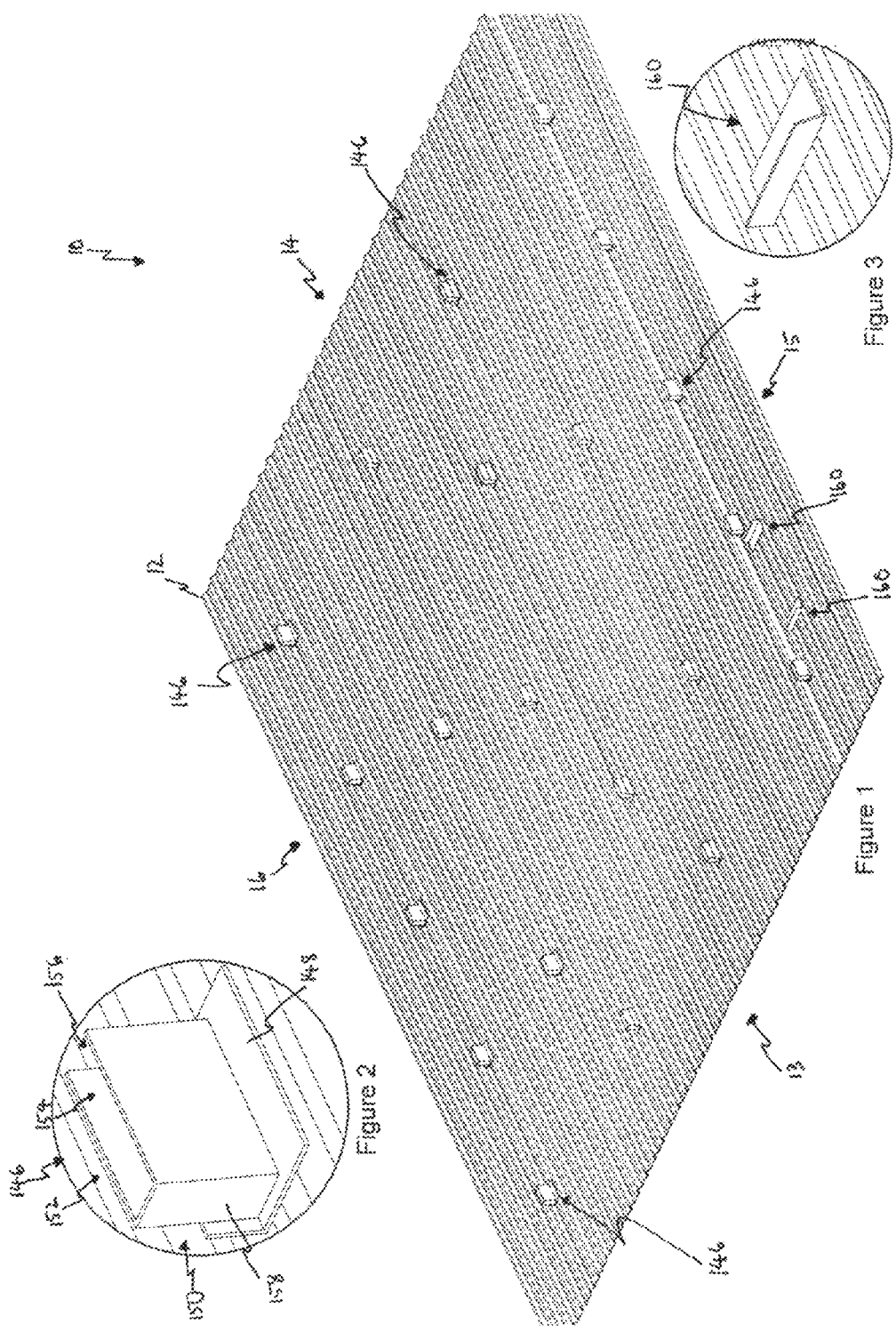

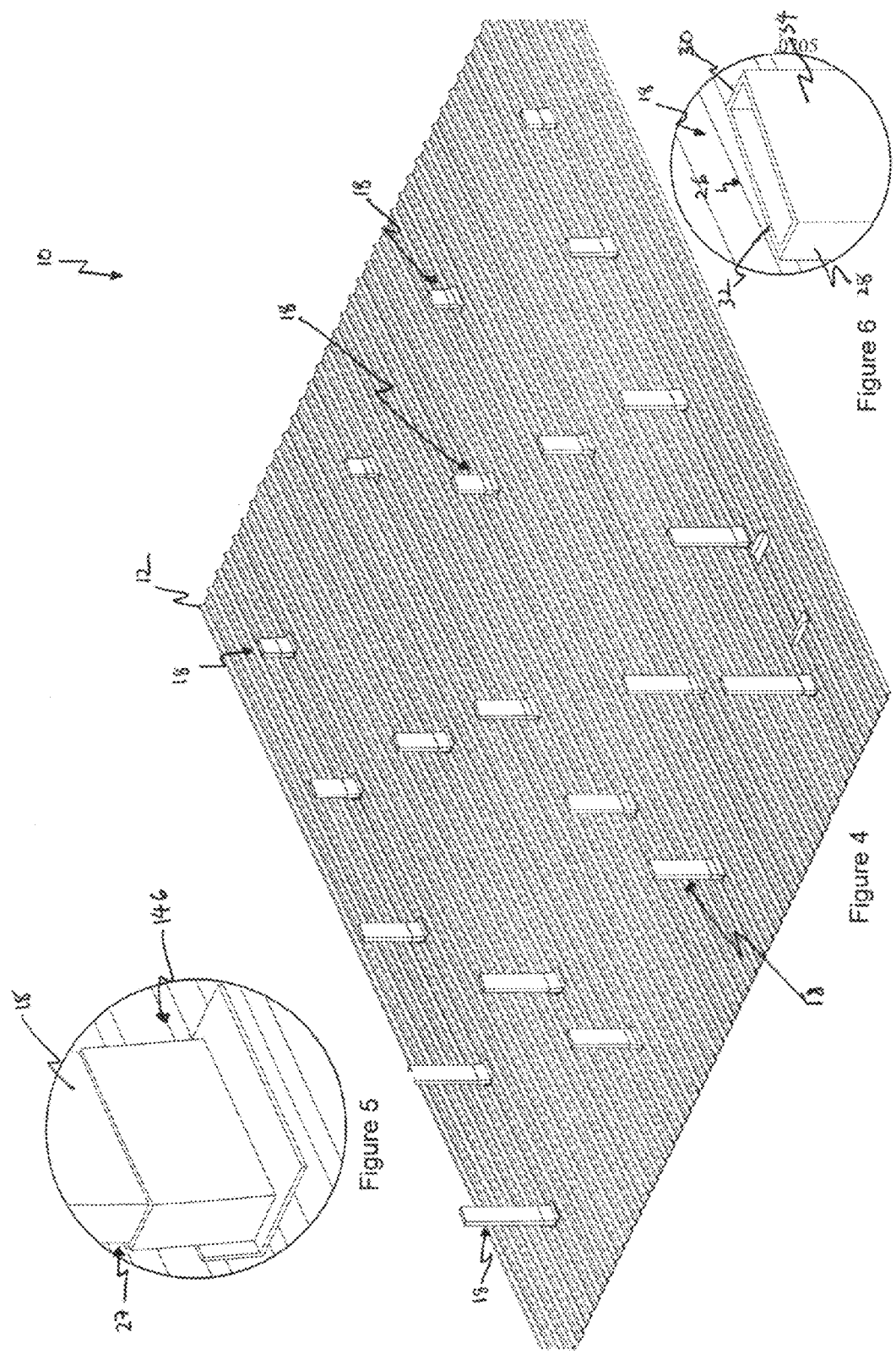

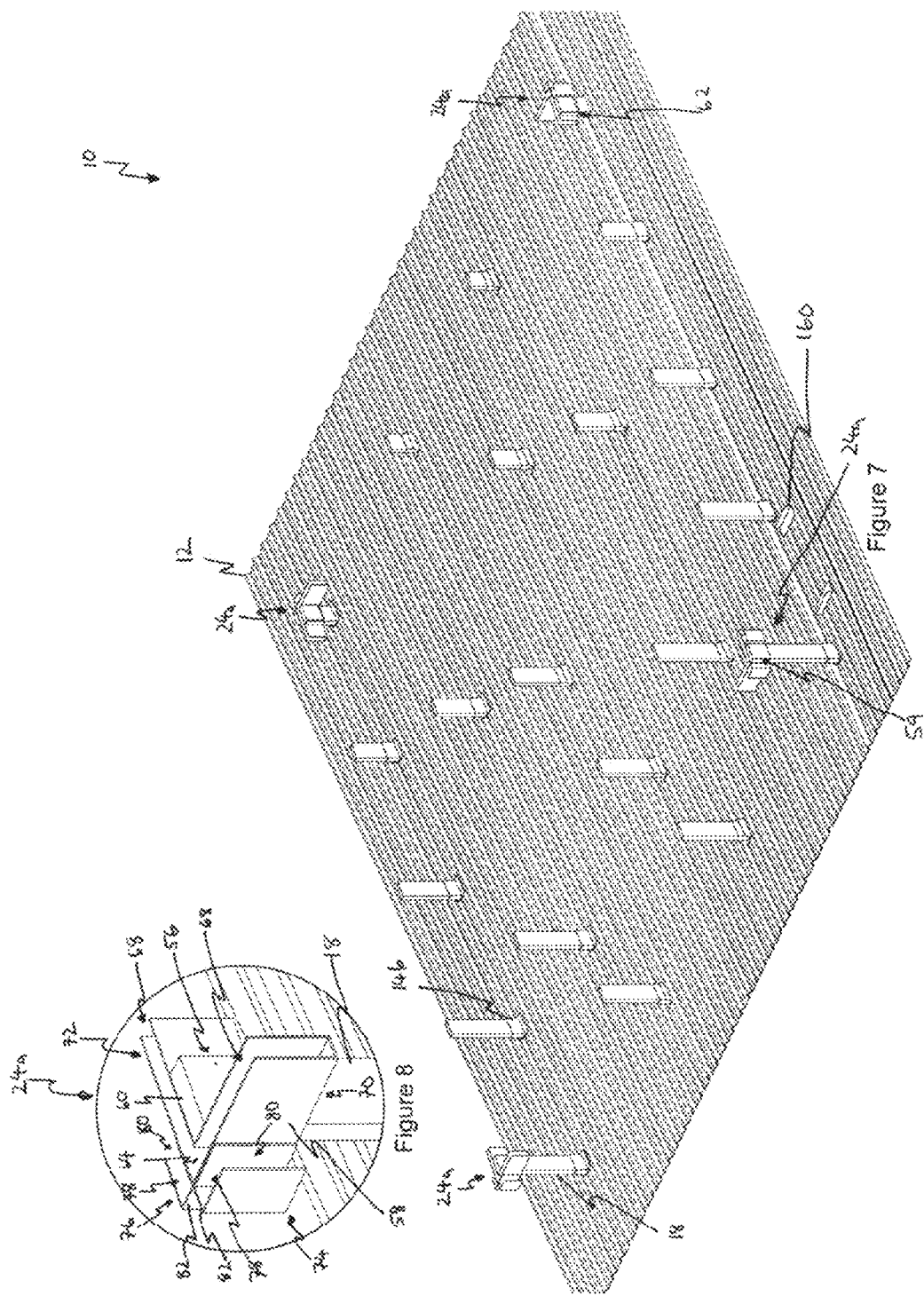

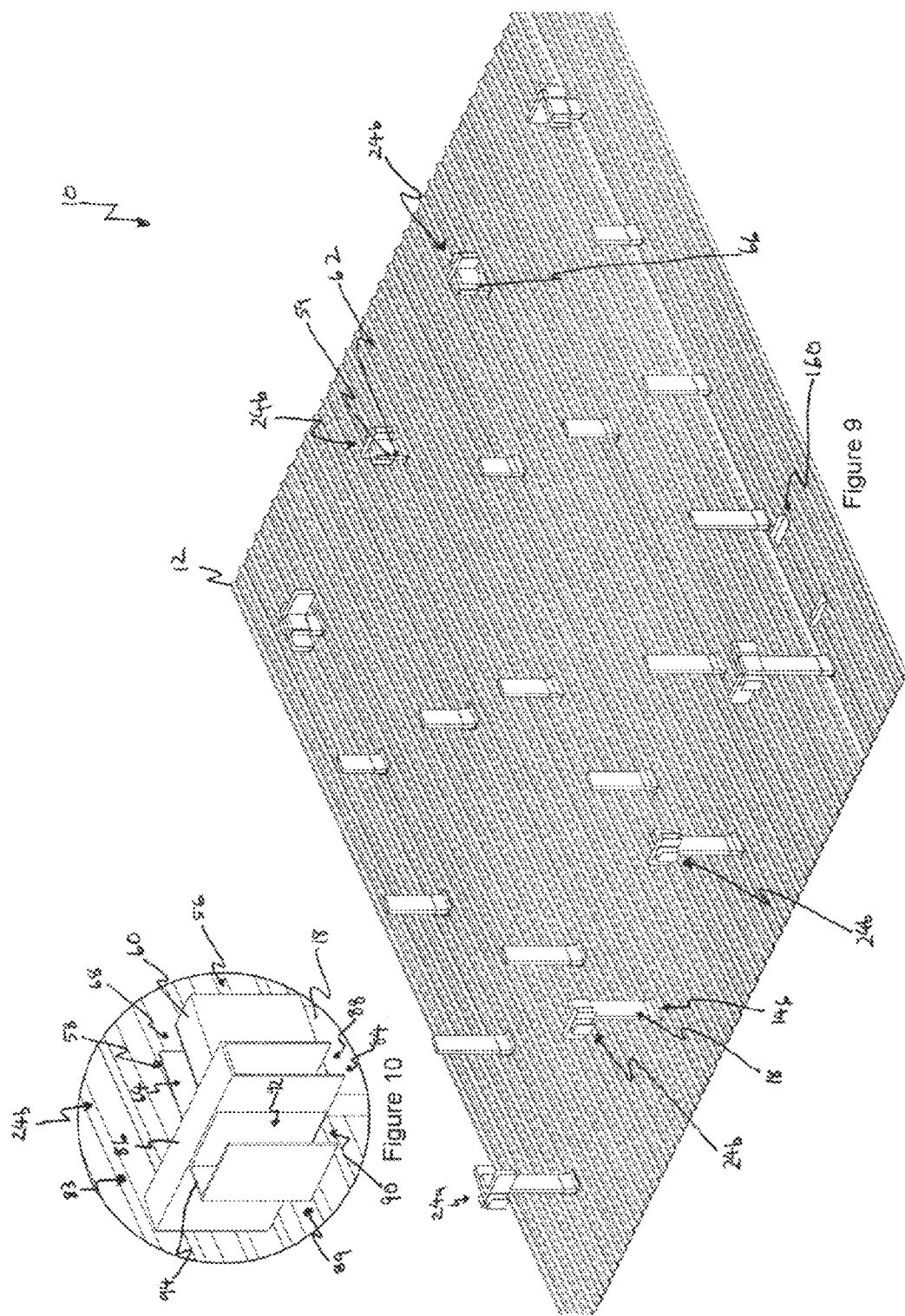

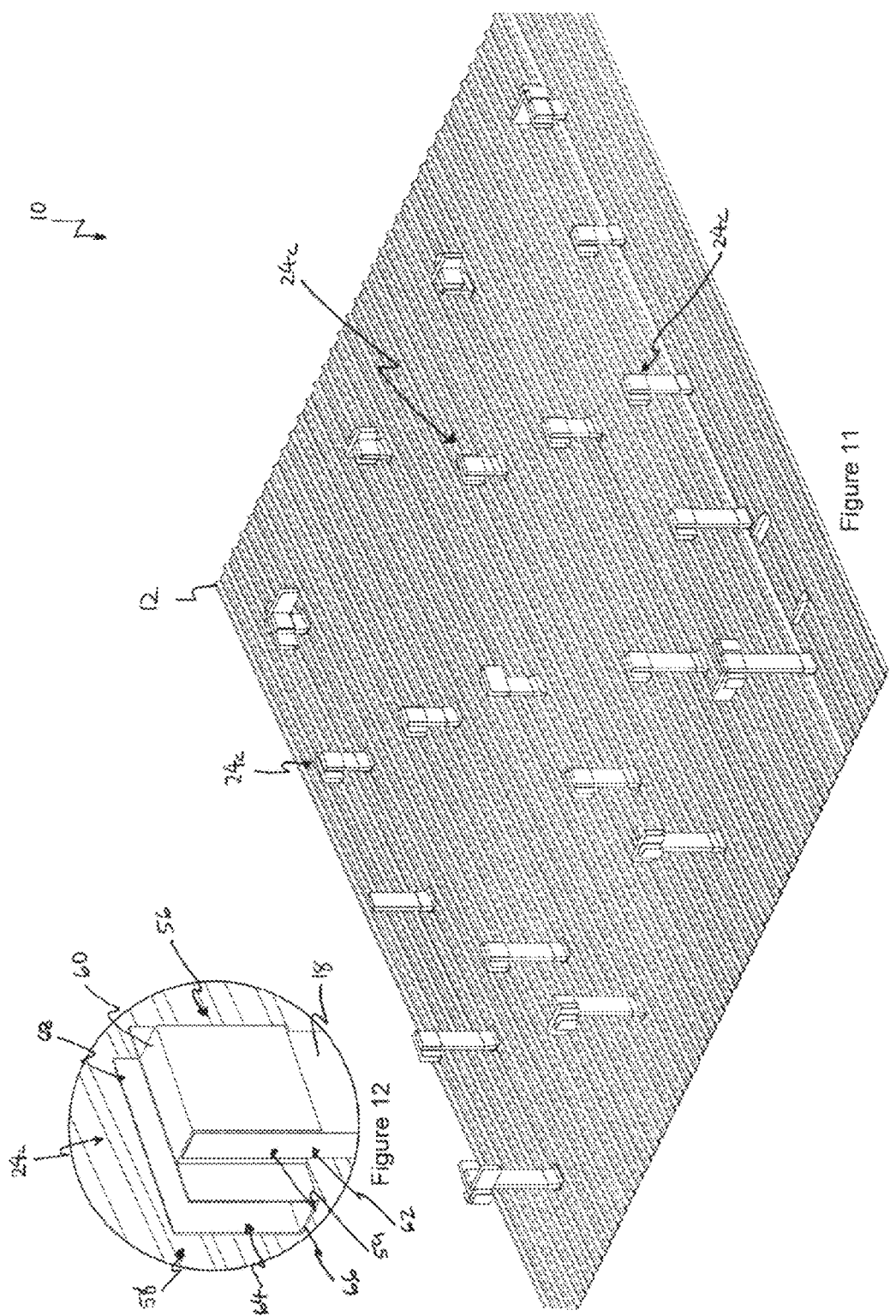

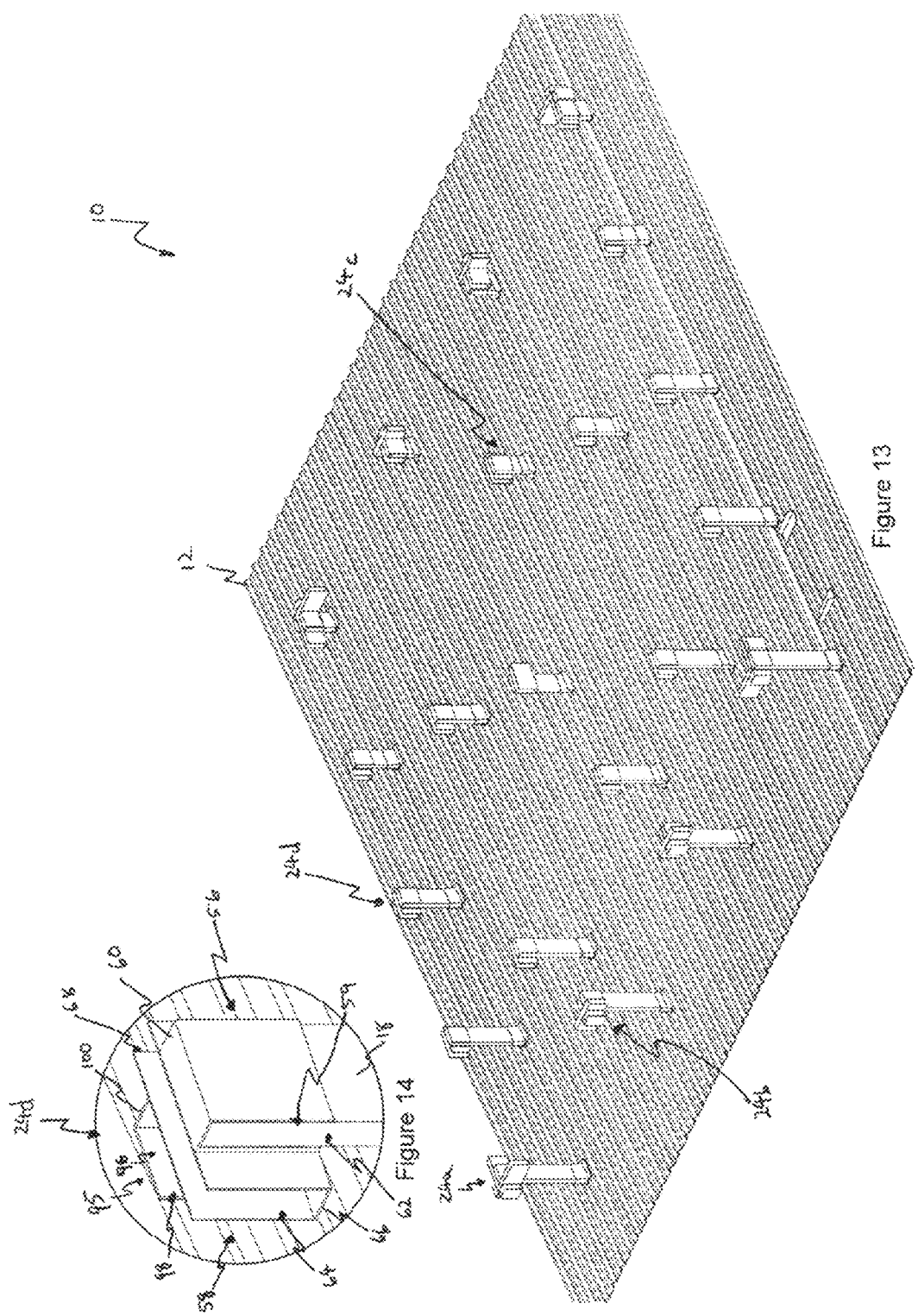

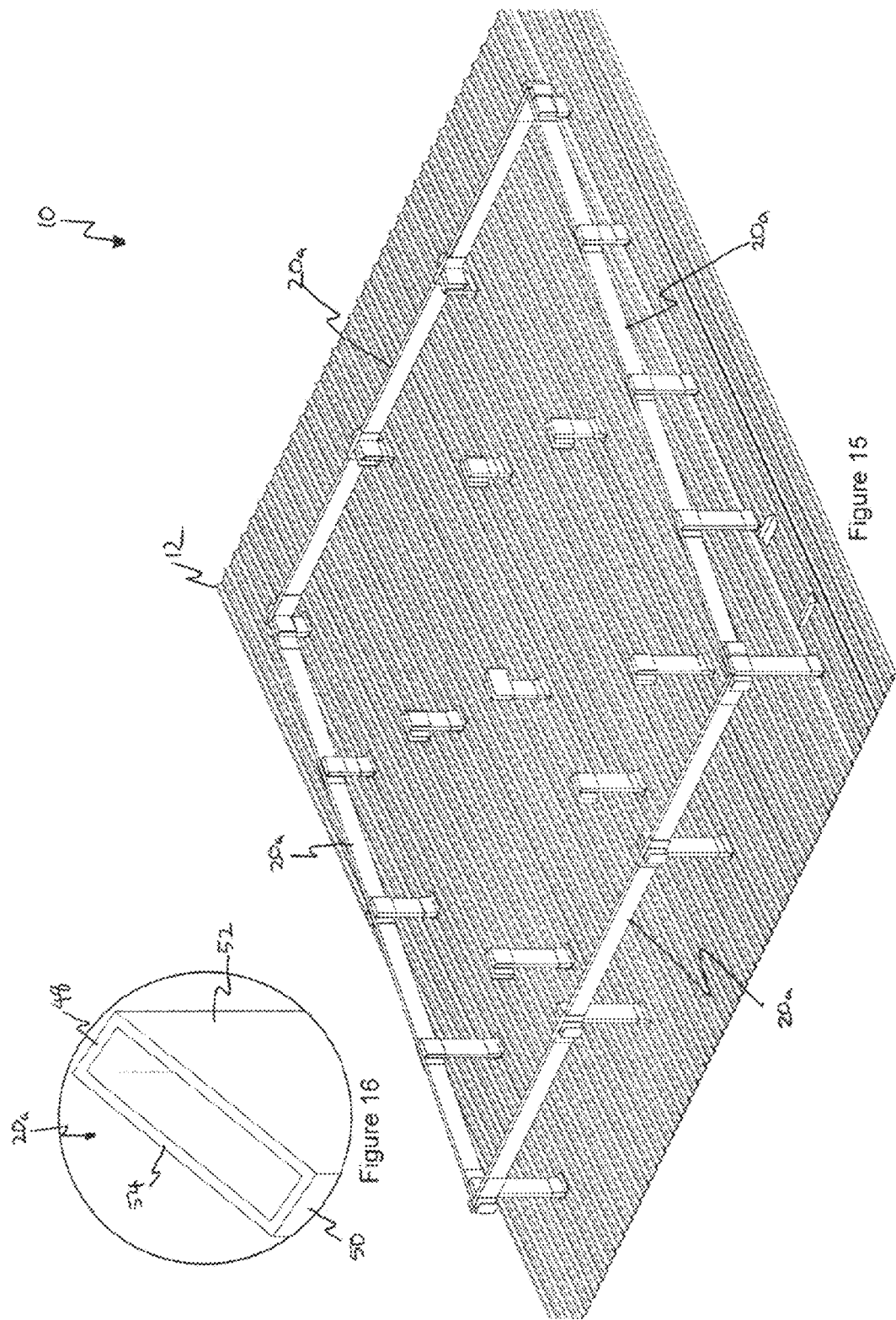

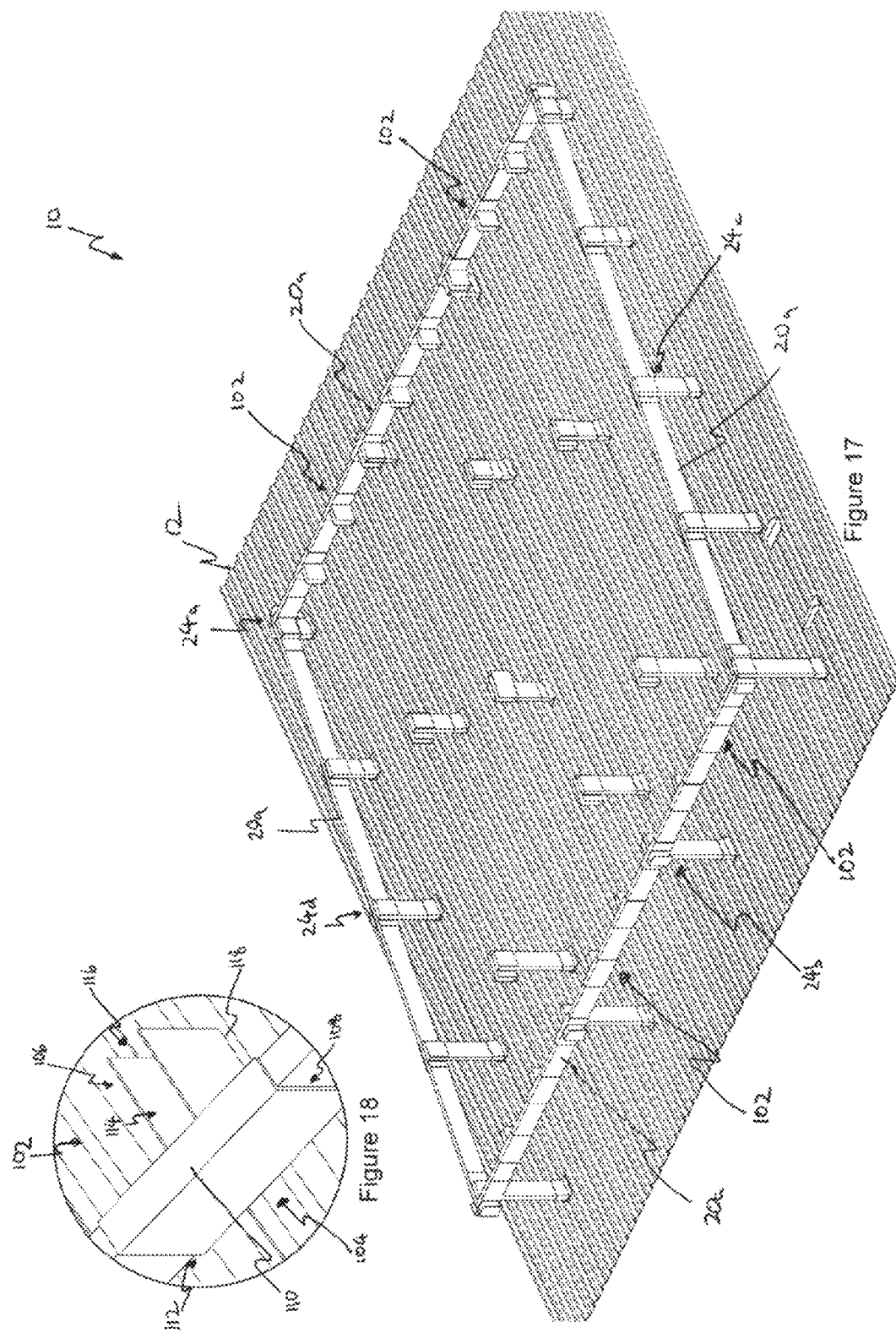

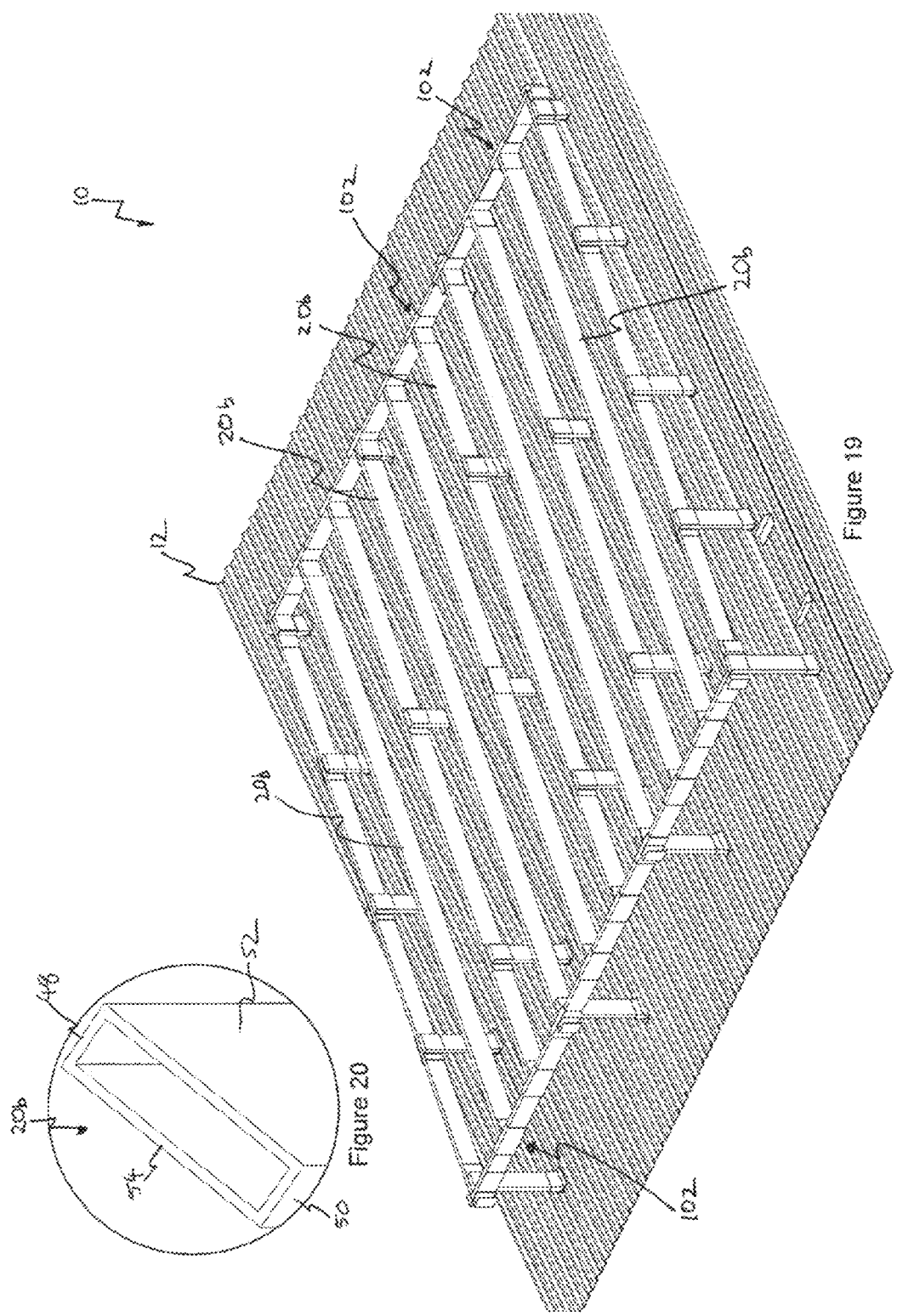

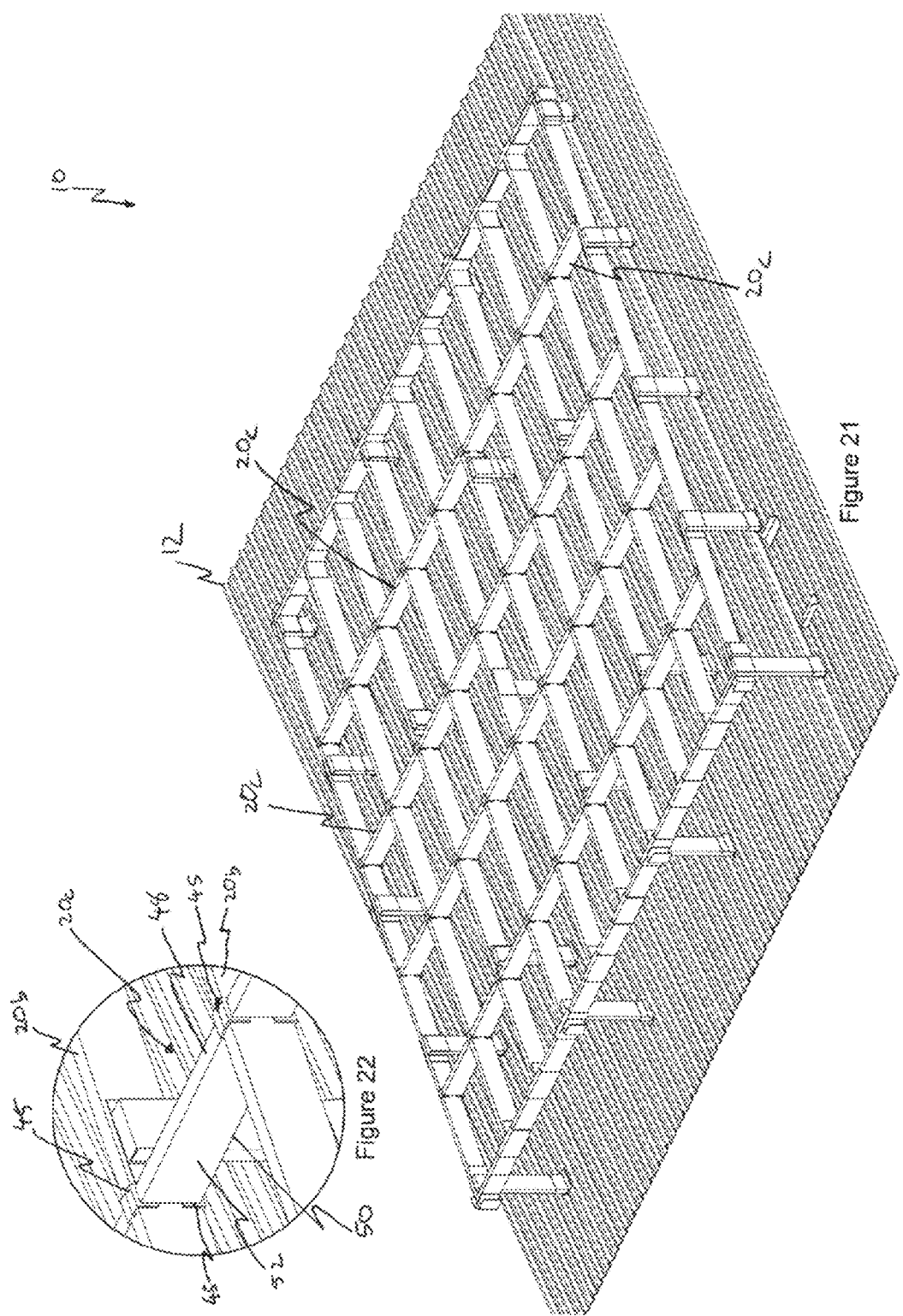

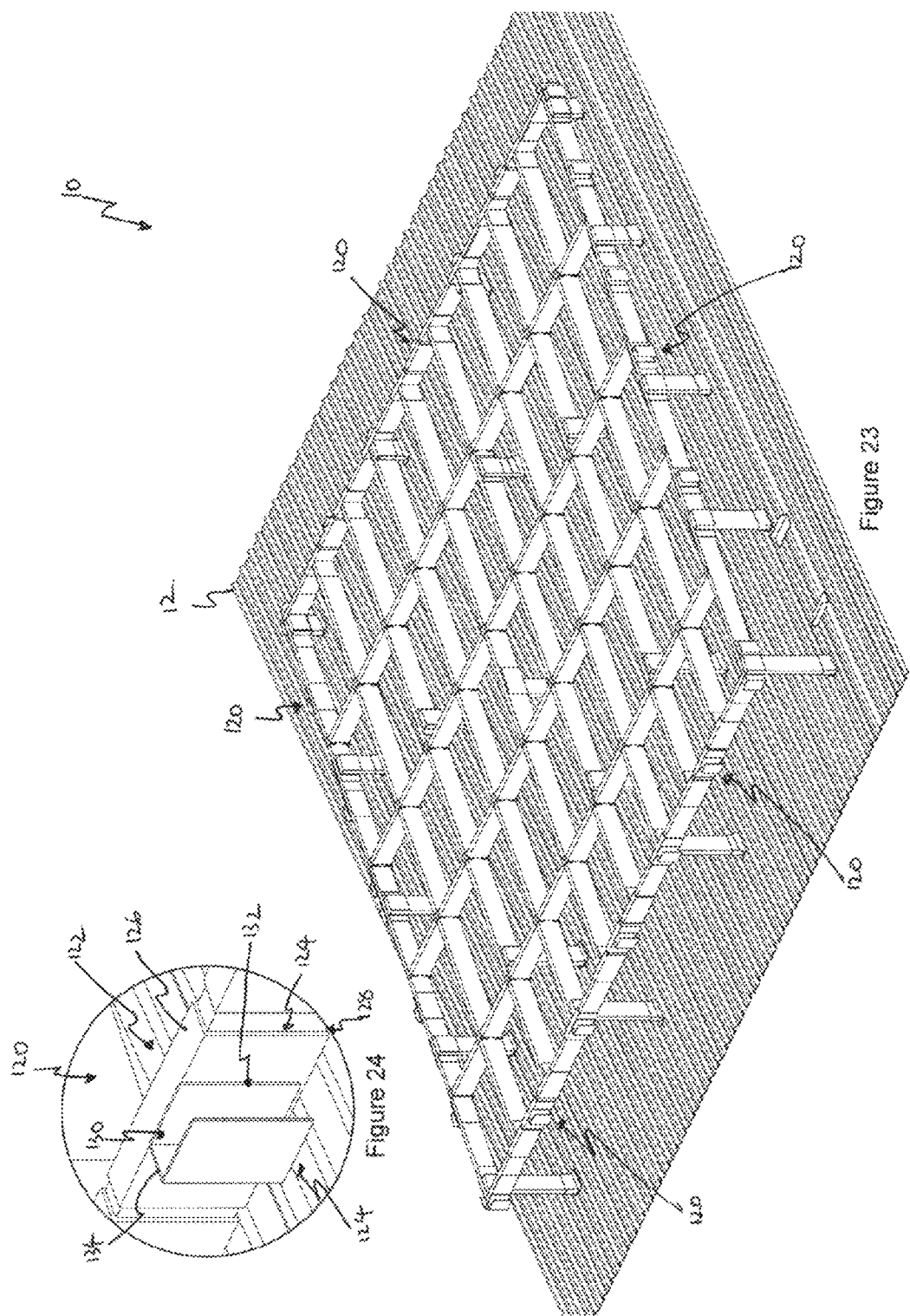

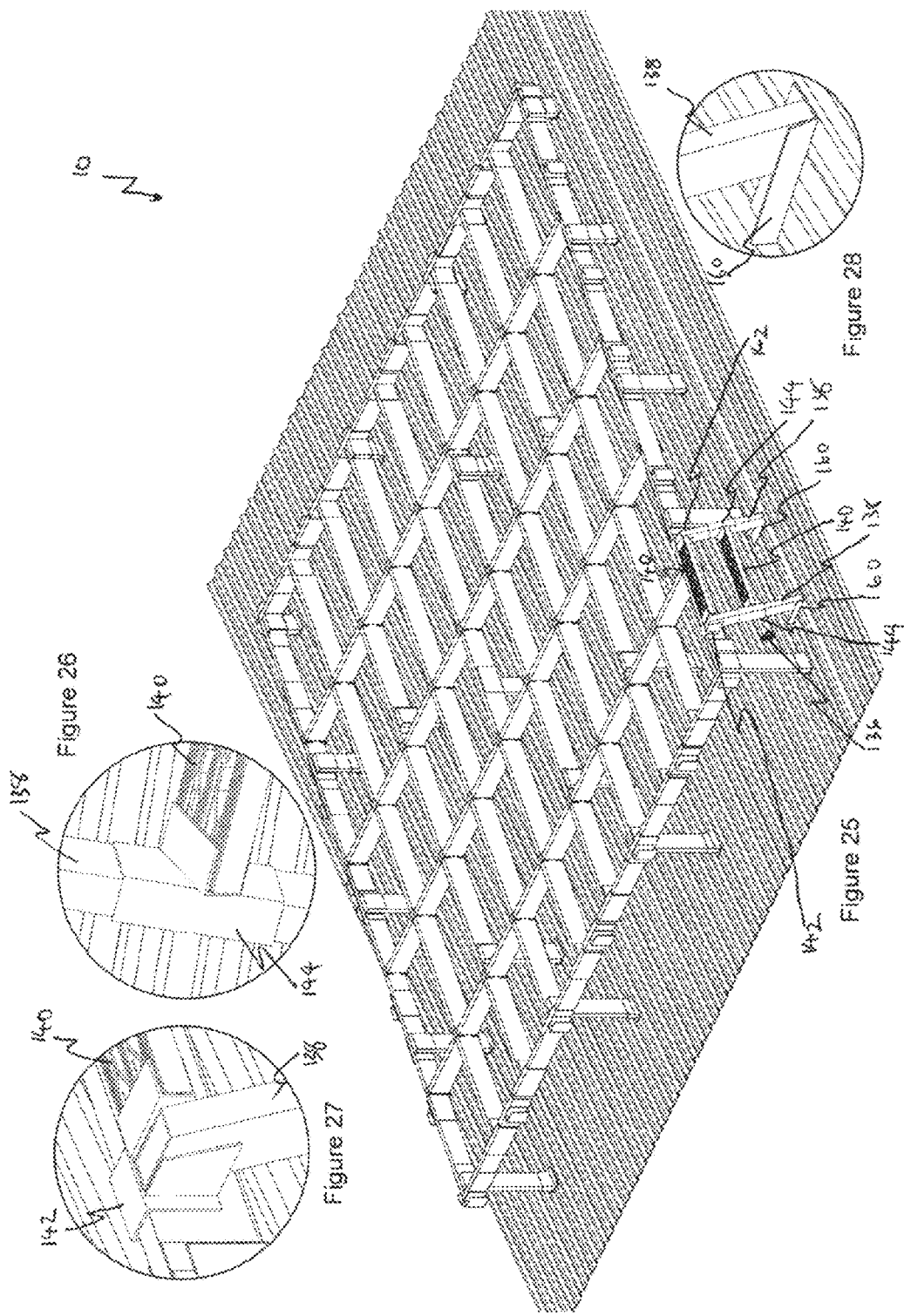

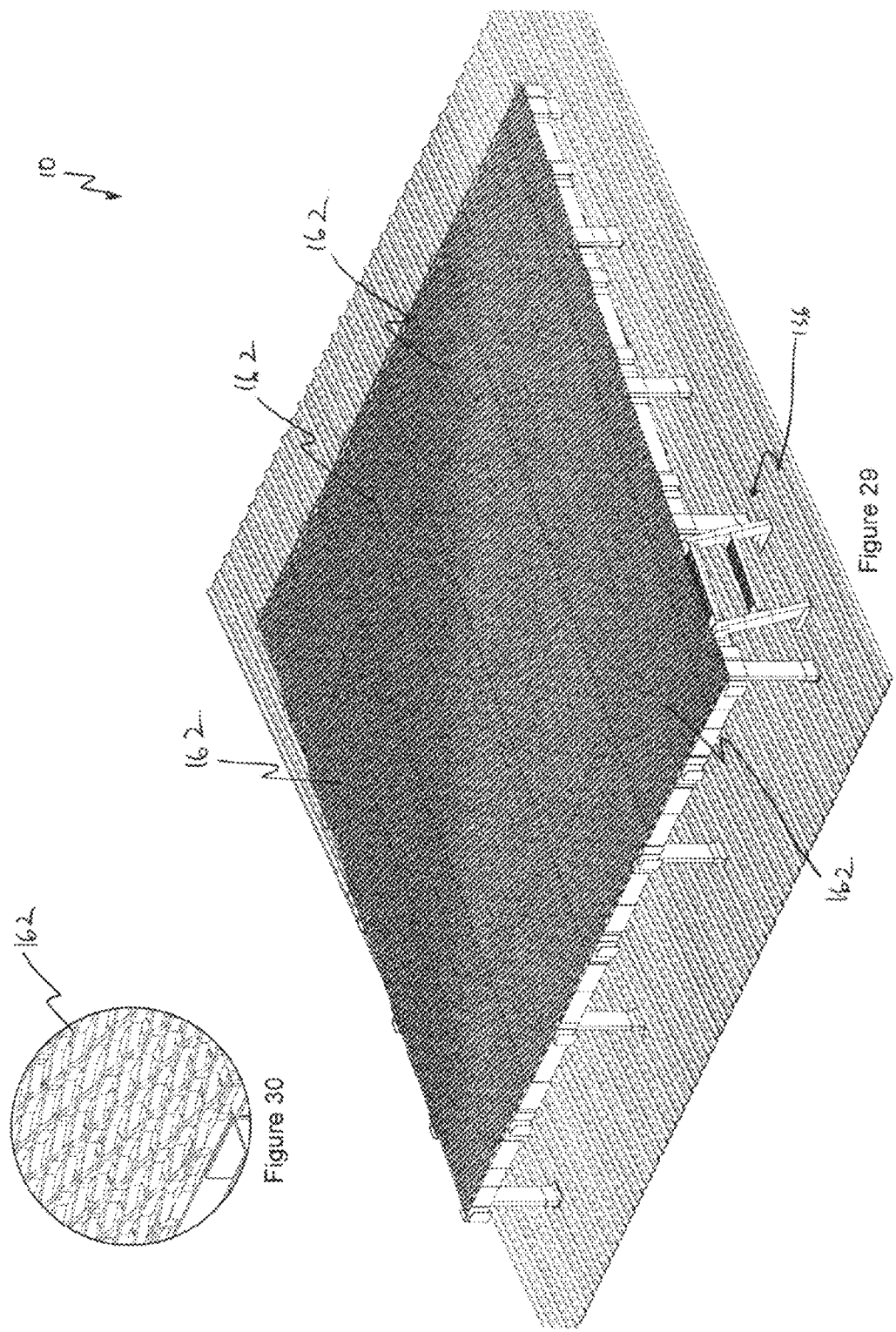

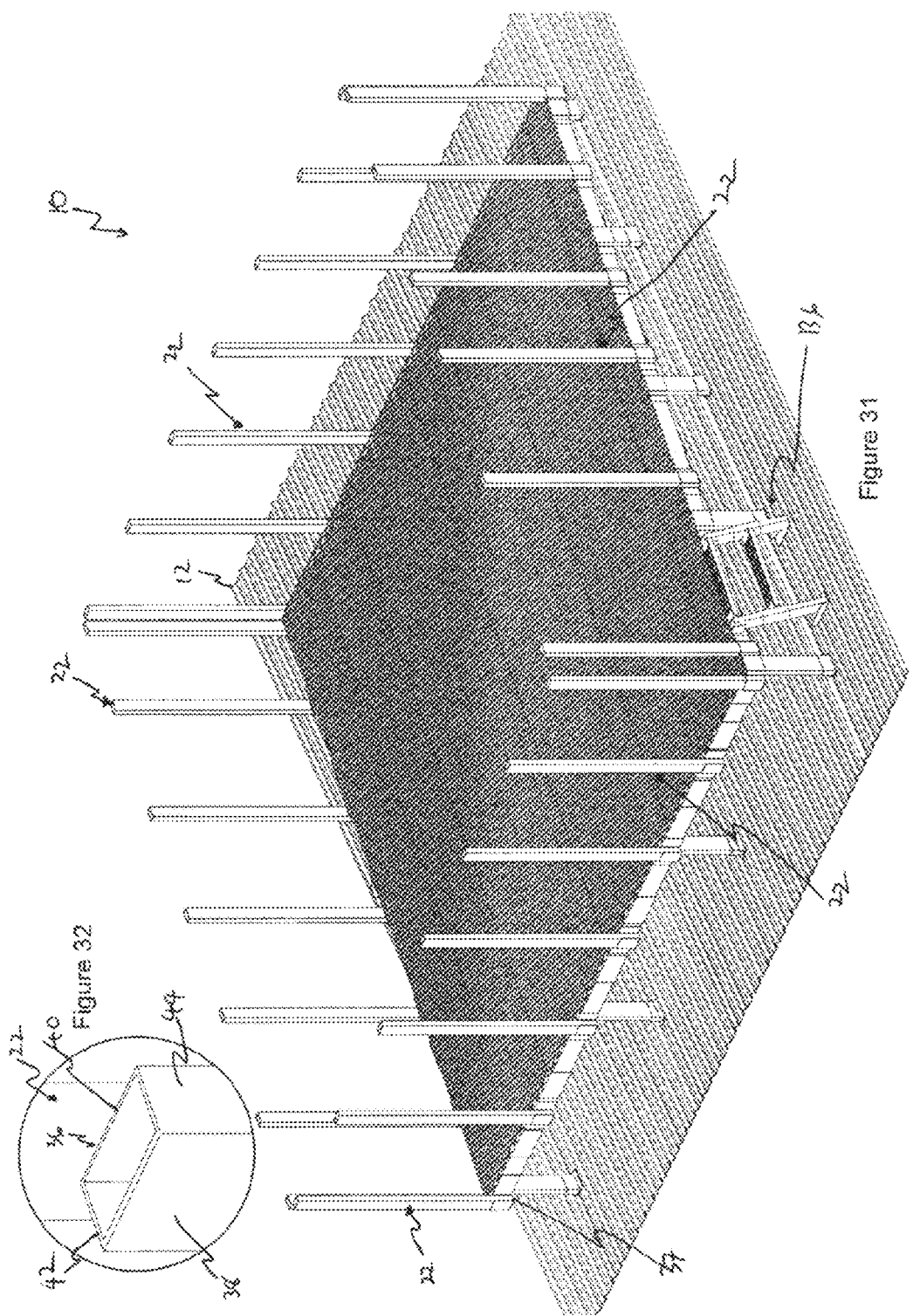

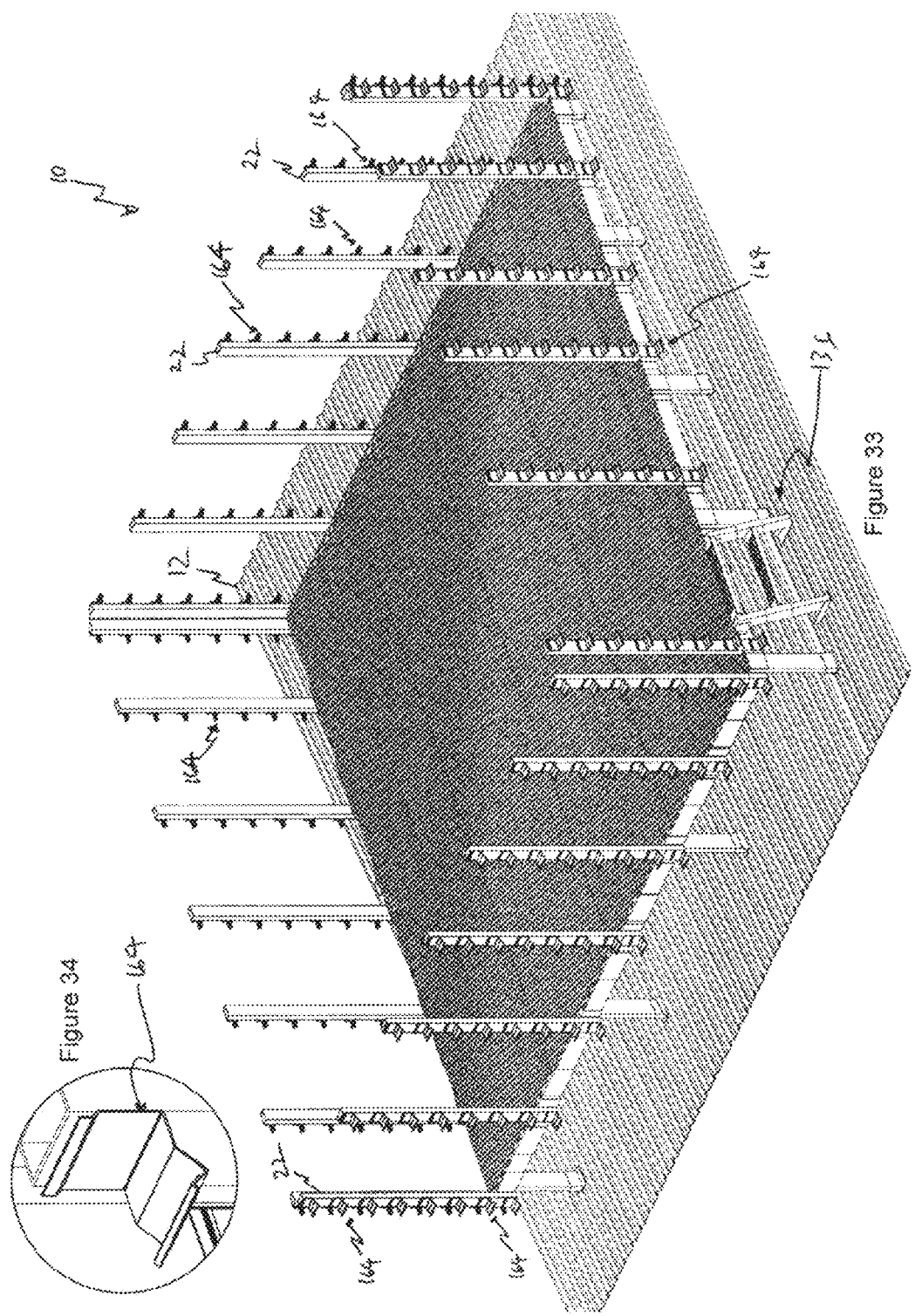

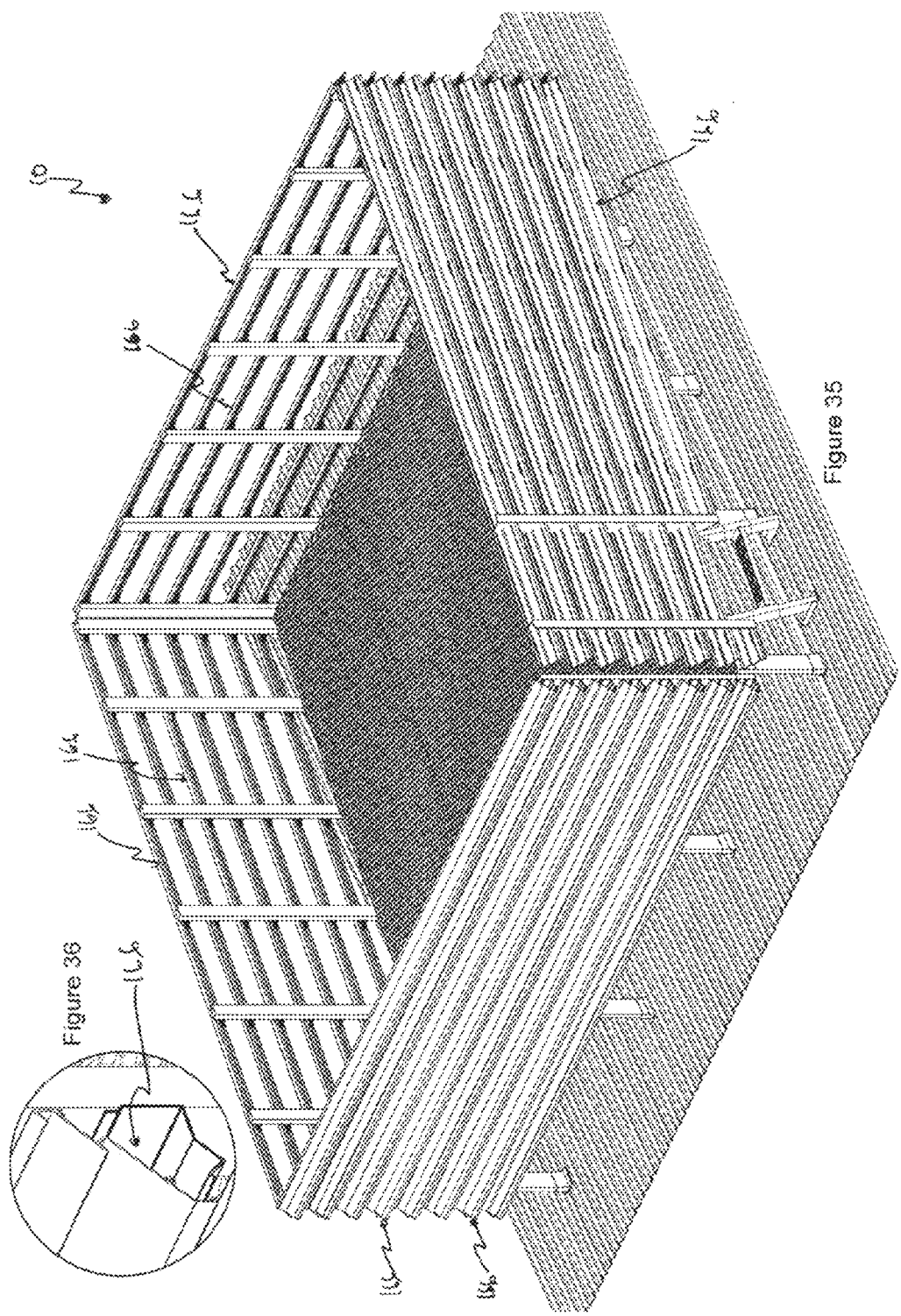

MODULAR PLATFORM ASSEMBLY AND A METHOD OF ASSEMBLING A MODULAR PLATFORM

FIELD

The present invention relates to a modular platform assembly and a method of assembling a modular platform.

The invention has been developed primarily for use in forming a roof top plant room and will be described hereinafter with reference to this application. However, it will be appreciated that the invention is not limited to this particular field of use. For example, the invention may be used in forming a roof top base (i.e. without an enclosure)

BACKGROUND

In residential and/or commercial buildings, plant rooms for air-conditioning and/or boiler equipment are located on the roofs. A roof top plant room will often be constructed with a platform that provides a raised and level surface for placement of the air-conditioning and/or boiler equipment. The platform allows for the air-conditioning equipment to be placed in a stable manner and for proper drainage, for example, during rain.

A known platform used in the construction of a roof top plant room is assembled from structural steel members. Typically, the known platform is fully assembled and then transported onto the roof for installation.

A disadvantage of the above known platform is that it is not easily adjustable to suit different conditions on the roof. A further disadvantage of the above known platform is that it is heavy and thereby creates substantial loads on the roof. This often requires the platform to be directly supported by one or more load bearing members of the building. Also, due to the heaviness, specialized heavy lifting equipment must be employed to move and/or position the above known platform during installation.

OBJECT OF THE INVENTION

It is the object of the present invention to substantially overcome or ameliorate one or more of the above disadvantages, or at least provide a useful alternative.

SUMMARY OF THE INVENTION

There is disclosed herein a modular platform assembly, including:
a plurality of legs;
a plurality of floor beams; and
a plurality of connectors for connecting the legs and the floor beams, each said connector comprising:
 a downwardly open blind recess with a closed top end and an open bottom end; and
 an upwardly open blind recess with a closed bottom end and an open top end,
wherein the legs are mounted into the downwardly open blind recesses of the connectors and the floor beams are mounted into the upwardly open blind recesses of the connectors such that the legs extend downwardly from the floor beams, and wherein an outer cross sectional periphery of at least one of the legs is substantially the same as an outer cross sectional periphery of at least one of the floor beams, and wherein each said beam has a top surface, the closed top ends of the downwardly open blind recesses and the top surfaces of the beams together defining a plane.

Each said leg is preferably mounted into a respective downwardly open blind recess.

A first type of the connectors is preferably a corner connector for connection at a corner of the assembly, the upwardly open blind recess of the corner connector has a first portion and a second portion, wherein one of the floor beams is mounted into the first portion and another of the floor beams is mounted into the second portion. The first portion is preferably arranged relative to the second portion such that the floor beam mounted into the first portion is angularly displaced from the floor beam mounted into the second portion. The floor beam mounted into the first portion is preferably angularly displaced from the floor beam mounted into the second portion by about 90 degrees.

A second type of the connectors is preferably a side connector for connection at a side of the assembly, wherein the side connector comprises a further downwardly open blind recess with a closed top end and an open bottom end, and wherein one of the floor beams is mounted into the upwardly open blind recess of the side connector and another of the floor beams is mounted into the further downwardly open blind recess of the side connector.

The upwardly open blind recess of the side connector is preferably arranged relative to the further downwardly open blind recess of the side connector such that the floor beam mounted into the upwardly open blind recess of the side connector is angularly displaced from the floor beam mounted into the further downwardly open blind recess of the side connector. The floor beam mounted into the upwardly open blind recess of the side connector is preferably angularly displaced from the floor beam mounted into the further downwardly open blind recess of the side connector by about 90 degrees.

The modular platform assembly preferably further includes an intermediate connector for connecting two of the floor beams, the intermediate connector comprising:
 a downwardly open blind recess with a closed top end and an open bottom end; and
 an upwardly open blind recess with a closed bottom end and an open top end,
wherein one of the floor beams is mounted into the downwardly open blind recess of the intermediate connector and another of the floor beams is mounted into the upwardly open blind recess of the intermediate connector.

The downwardly open blind recess of the intermediate connector is preferably arranged relative to the upwardly open blind recess of the intermediate connector such that the floor beam mounted into the downwardly open blind recess of the intermediate connector is angularly displaced from the floor beam mounted into the upwardly open blind recess of the intermediate connector. The floor beam mounted into the downwardly open blind recess of the intermediate connector is preferably angularly displaced from the floor beam mounted into the upwardly open blind recess of the intermediate connector by about 90 degrees.

The modular platform assembly preferably further includes a plurality of uprights, each said upright extending upwardly from a respective connector located at the periphery of the assembly such that the uprights define an interior.

The modular platform assembly preferably further includes a plurality of base connectors for securing to a base, wherein the legs are mounted onto the base connectors such that the legs extend upwardly therefrom.

The modular platform assembly preferably further includes one or more mesh plates mounted on top of the floor beams to define a floor.

There is also disclosed herein a method of assembling a modular platform, the method comprising the steps of:

arranging a plurality of legs into at least an intended periphery of the platform; mounting the legs into downwardly open blind recesses of a plurality of connectors, each said downwardly open blind recess having a closed top end and an open bottom end; and mounting a plurality of floor beams into upwardly open recesses of the connectors such that the legs extend downwardly from the floor beams, each said upwardly open recess having a closed bottom end and an open top end, and wherein an outer cross sectional periphery of at least one of the legs is substantially the same as an outer cross sectional periphery of at least one of the floor beams, and wherein each said beam has a top surface, the closed top ends of the downwardly open blind recesses and the top surfaces of the beams together defining a plane.

The step of mounting the legs into downwardly open blind recesses preferably comprises mounting each said leg into a respective downwardly open blind recess.

A first type of the connectors is preferably a corner connector for connection at a corner of the assembly, the upwardly open blind recess of the corner connector has a first portion and a second portion, wherein the step of mounting the floor beams into upwardly open recesses of the connectors comprises mounting one of the floor beams into the first portion and mounting another of the floor beams into the second portion. The first portion is preferably arranged relative to the second portion such that the floor beams mounted into the first portion is angularly displaced from the floor beam mounted into the second portion.

BRIEF DESCRIPTION OF DRAWINGS

A preferred embodiment of the invention will be described hereinafter, by way of example only, with reference to the accompanying drawings, wherein:

FIG. 1 is a perspective view of a modular platform assembly being installed on a roof with base connectors and ladder base connectors of the assembly bolted to the roof;

FIG. 2 is an enlarged view of one of the base connectors of FIG. 1;

FIG. 3 is an enlarged view of one of the ladder base connectors of FIG. 1;

FIG. 4 is a perspective view of the assembly of FIG. 1 with legs mounted onto the base connectors;

FIG. 5 is an enlarged view of a bottom end of one of the legs of FIG. 4;

FIG. 6 is an enlarged view of a top end of one of the legs of FIG. 4;

FIG. 7 is a perspective view of the assembly of FIG. 4 with corner connectors mounted onto the legs located at the corners;

FIG. 8 is an enlarged view of one of the corner connectors of FIG. 7;

FIG. 9 is a perspective view of the assembly of FIG. 7 with front-back side connectors mounted onto the legs located at the front side and back side of the assembly;

FIG. 10 is an enlarged view of the one of the front-back side connectors of FIG. 9;

FIG. 11 is a perspective view of the assembly of FIG. 9 with standard connectors mounted onto the remaining legs except a leg located at the left side in the middle;

FIG. 12 is an enlarged view of one of the standard connectors of FIG. 11;

FIG. 13 is a perspective view of the assembly of FIG. 11 with a standard-upright connector mounted onto the remaining leg located at the left side in the middle;

FIG. 14 is an enlarged view of the standard-upright connector of FIG. 13;

FIG. 15 is a perspective view of the assembly of FIG. 13 with peripheral floor beams mounted into the corner, front-back side, standard and standard-upright connectors located at the periphery;

FIG. 16 is an enlarged view of an end of one of the peripheral floor beams;

FIG. 17 is a perspective view of the assembly of FIG. 15 with intermediate connectors mounted onto the peripheral floor beams;

FIG. 18 is an enlarged view of one the intermediate connectors of FIG. 17;

FIG. 19 is a perspective view of the assembly of FIG. 17 with primary cross floor beams mounted into the standard, standard-upright and front-back side connectors;

FIG. 20 is an enlarged view of an end of one of the primary cross floor beams of FIG. 19;

FIG. 21 is a perspective view of the assembly of FIG. 18 with secondary cross floor beams mounted onto the peripheral floor beams and the primary cross floor beams;

FIG. 22 is an enlarged view of one of the secondary cross floor beams of FIG. 21 with a pair of L-brackets on either end;

FIG. 23 is a perspective view of the assembly of FIG. 21 with upright connectors mounted onto the peripheral floor beams;

FIG. 24 is an enlarged view of one of the upright connectors of FIG. 23;

FIG. 25 is a perspective view of the assembly of FIG. 23 with a modular ladder mounted to one of the peripheral floor beams and the ladder base connectors;

FIG. 26 is an enlarged view a step of the ladder of the assembly of FIG. 25;

FIG. 27 is an enlarged view of a connection between the ladder and one of the peripheral floor beams of the assembly of FIG. 25;

FIG. 28 is an enlarged view of a connection between the ladder and one of the ladder base connectors of the assembly of FIG. 25;

FIG. 29 is a perspective view of the assembly of FIG. 25 with mesh plates mounted onto the peripheral, primary cross and secondary cross floor beams;

FIG. 30 is an enlarged view of one of the mesh plates of FIG. 29;

FIG. 31 is a perspective view of the assembly of FIG. 29 with uprights mounted to the corner, front-back side, upright and standard-upright connectors;

FIG. 32 is an enlarged view of an end of one of the uprights of FIG. 31;

FIG. 33 is a perspective view of the assembly of FIG. 31 with louver connectors attached to the uprights;

FIG. 34 is an enlarged view of one of the louver connectors of FIG. 33;

FIG. 35 is a perspective view of the assembly of FIG. 33 with louvers mounted to the louver connectors;

FIG. 36 is an enlarged view of one of the louvers mounted to a respective louver connector of the modular platform assembly of FIG. 35;

DESCRIPTION OF EMBODIMENTS

Figure 37:
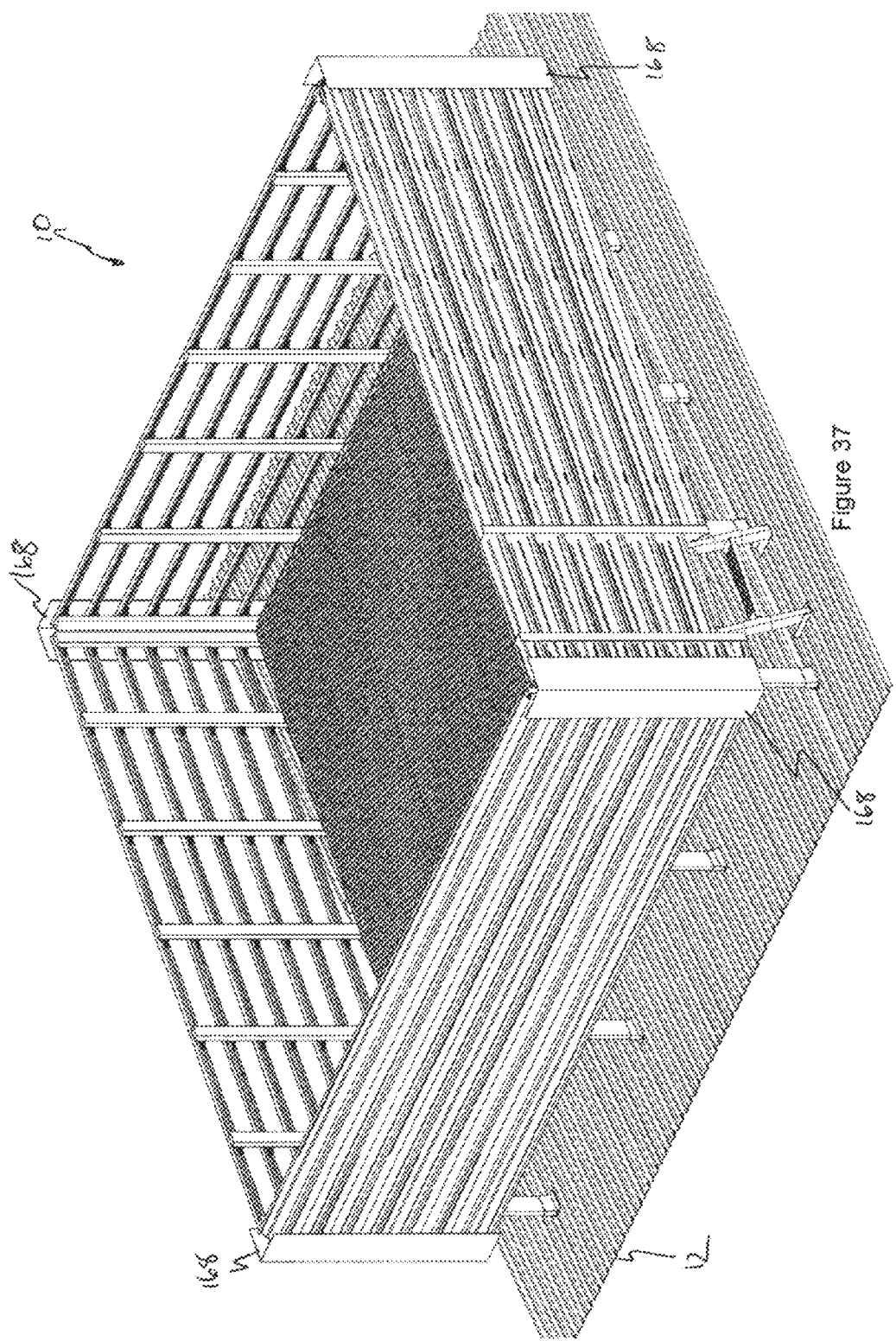
FIG. 37 is a perspective view of the assembly of FIG. 35 fully installed on the roof with corner louvers mounted at the corners.

FIGS. 1 to 38 show an embodiment of a modular platform assembly 10 for installation on a roof 12 to form a plant room. The roof 12 has a front 13, a back 14, a right side 15 and a left side 16. The roof 12 is corrugated and declines from the back 14 to the front 13.

The assembly 10, which is of aluminum construction, comprises legs 18, floor beams 20*a,b,c*, uprights 22 and connectors 24*a,b,c,d* for connecting the legs 18 and the floor beams 20*a,b,c*. As shown in FIGS. 4 to 6, each leg 18 is in the form of an extruded rectangular tube with a hollow interior. Each leg 18 has a top end 26, a bottom end 27, a front wall 28, a back wall 30, a left wall 32 and a right wall 34. The walls 28, 30, 32, 34 are of substantial thickness to provide structural rigidity.

As shown in FIGS. 31 and 32, each upright 22 is also in the form of an extruded rectangular tube with a hollow interior. Each upright 22 has a top end 36, a bottom end 37 and walls 38, 40, 42, 44. The walls 38, 40, 42, 44 are of substantial thickness to provide structural rigidity.

As shown in FIGS. 15, 16 and 19 to 22, each floor beam 20*a,b,c* is in the form of an extruded rectangular tube with a hollow interior. Each floor beam 20*a,b,c* has a top wall 48, a bottom wall 50, a front wall 52 and a back wall 54. The walls 48, 50, 52, 54 are of substantial thickness to provide structural rigidity. As shown in FIGS. 15 and 16, a first type of the floor beams 20*a,b,c* is the peripheral floor beams 20*a*. The peripheral floor beams 20*a* are locatable at the periphery of the assembly 10. As shown in FIGS. 19 and 20, a second type of the floor beams 20*a,b,c* is the primary cross floor beams 20*b*. The primary cross floor beams 20*b* are locatable within the periphery of the assembly 10 and configured to extend between the back and the front of the assembly 10. As shown in FIGS. 21 and 22, a third type of the floor beams 20*a,b,c* is the secondary cross floor beams 20*c*. The secondary cross floor beams 20*c* are locatable within the periphery of the assembly 10, and configured to extend from the left side towards the right side of the assembly 10 either between one peripheral floor beam 20*a* and one primary cross beam 20*b* or between a pair of primary cross beams 20*b*. Each of the secondary cross floor beams 20*c* has a pair of L-brackets 45 on either end to allow for mounting to either a pair of the primary cross floor beams 20*b* or one peripheral floor beam 20*a* and one primary cross floor beam 20*b*.

It will be appreciated that the outer dimensions of the legs 18, floor beams 20*a,b,c* and uprights 22 are the same.

As shown in FIGS. 7 to 14, each connector 24*a,b,c,d* comprises a first U-shaped extrusion 56 and a second U-shaped extrusion 58 welded thereto. Each first U-shaped extrusion 56 has a downwardly open blind recess 59 with a closed top end 60 and an open bottom end 62. Each downwardly open blind recess 59 is dimensioned to receive a respective leg 18 for mounting such that the top end 26 of that respective leg 18 abuts with the closed top end 60. The second U-shaped extrusion 58 has an upwardly open blind recess 64 with a closed bottom end 66 and an open top end 68.

As shown in FIGS. 7 and 8, a first type of the connectors 24*a,b,c,d* is the corner connectors 24*a* for connection of two peripheral floor beam 20*a* and one leg 18 at a corner of the assembly 10. In each corner connector 24*a*, the second U-shaped extrusion 58 is substantially bent such that the upwardly open blind recess 64 defines a first portion 70 and a second portion 72 which is orthogonal to the first portion 70. In each corner connector 24*a*, the first portion 70 is dimensioned to receive one of the peripheral floor beams 20*a* and the second portion 72 is dimensioned to receive another of the peripheral floor beams 20*a* for mounting such that the bottom walls 50 of both peripheral floor beams 20*a* mounted therein are in abutment with the closed bottom end 66 and the top walls 48 of both peripheral floor beams 20*a* mounted therein slightly protrudes through the open top end 68. Further, in each corner connector 24*a*, a peripheral floor beam 20*a* mounted in the first portion 70 is angularly displaced from a peripheral floor beam 20*a* mounted in the second portion 72 by about 90 degrees. Each corner connector 24*a* also comprises a pair of upright U-shaped extrusion 74, 76 welded to the second U-shaped extrusion 58. In each corner connector 24*a*, the upright U-shaped extrusion 74 is adjacent to the first portion 70 and the upright U-shaped extrusion 76 is adjacent to the second portion 72. Each of the upright U-shaped extrusions 74, 76 has an open sideward open blind recess 78 with an open side 80 and a closed side 82. Each open sideward open blind recess 78 is dimensioned to receive a respective upright 22 for mounting such that the upright 22 mounted therein extends upwardly therefrom.

As shown in FIGS. 9 and 10, a second type of the connectors 24*a,b,c,d* is the front-back side connectors 24*b* for connection of a primary cross floor beam 20*b*, a peripheral floor beam 20*a* and a leg 18 at the front and back of the assembly 10. In each front-back side connector 24*b*, the upwardly open blind recess 64 is dimensioned to receive one of the primary cross floor beams 20*b* for mounting such that the bottom wall 50 of the primary cross floor beam 20*b* mounted therein is in abutment with the closed bottom end 66 and the top wall 48 of the primary cross floor beam 20*b* mounted therein slightly protrudes through the open top end 68. Each front-back side connector 24*b* further comprises a third U-shaped extrusion 83 welded to the both the first and second U-shaped extrusions 56, 58. Each third U-shaped extrusion 83 has a further downwardly open blind recess 84 with a closed top end 86 and an open bottom end 88. Each further downwardly open blind recess 84 is dimensioned to receive one of the peripheral floor beams 20*a* for mounting such that the top wall 48 of the peripheral floor beam 20*a* mounted therein is in abutment with the closed top end 86. In each front-back side connector 24*b*, the downwardly open blind recess 59 is substantially parallel to the upwardly open blind recess 64, and the further downwardly open blind recess 84 is orthogonal to both the downwardly and upwardly open blind recesses 59, 64 such that a peripheral floor beam 20*a* mounted in the further downwardly open blind recess 84 is angularly displaced from a primary cross beam 20*b* mounted in the upwardly open blind recess 64 by about 90 degrees. Each front-back side connector 24*b* further comprises an upright U-shaped extrusion 89 welded to third U-shaped extrusion 83. Each upright U-shaped extrusion 89 has an open sideward open blind recess 90 with an open side 92 and a closed side 94. Each open sideward open blind recess 90 is dimensioned to receive and mount a respective upright 22 such that the upright 22 mounted therein extends upwardly therefrom.

As shown in FIGS. 11 and 12, a third type of the connectors 24*a,b,c,d* is the standard connectors 24*c* for connection of a leg 18 and either a peripheral floor beam 20*a* or a primary cross floor beam 20*b*. In each standard connector 24*c*, the upwardly open blind recess 64 is dimensioned to receive either a peripheral floor beam 20*a* or a primary cross floor beam 20*b* for mounting such that the bottom wall 50 of either the peripheral or the primary cross floor beam 20*a*, 20*b* mounted therein is in abutment with the closed bottom end 66 and the top wall 48 of either the peripheral or the primary cross floor beam 20*a*, 20*b* mounted therein slightly protrudes through the open top end 68. In each standard connector 24c, the downwardly open blind recess 59 is substantially parallel to the upwardly open blind recess 64.

As shown in FIGS. 13 and 14, a fourth type of the connectors 24a,b,c,d is a standard-upright connector 24d for connection of a leg 18 and a peripheral floor beam 20a. In each standard-upright connector 24d, the upwardly open blind recess 64 is dimensioned to receive a peripheral floor beam 20a for mounting such that the bottom wall 50 of the peripheral floor beam 20a mounted therein is in abutment with the closed bottom end 66 and the top wall 48 of the peripheral floor beam 20a mounted therein slightly protrudes through the open top end 68. In the standard-upright connector 24d, the downwardly open blind recess 59 is substantially parallel to the upwardly open blind recess 64. The standard-upright connector 24d further comprises an upright U-shaped extrusion 95 welded to the second U-shaped extrusion 58. The upright U-shaped extrusion 95 of the standard-upright connector 24d has a sideward open blind recess 96 with an open side 98 and a closed side 100. Each open sideward open blind recess 96 is dimensioned to receive and mount an upright 22 therein such that the upright 22 mounted therein extends upwardly therefrom.

As shown in FIGS. 17 and 18, the assembly 10 further comprises intermediate connectors 102 for connecting a peripheral floor beam 20a and a primary cross beam 20b. Each intermediate connector 102 comprises a first U-shaped extrusion 104 and a second U-shaped extrusion 106 welded thereto. Each first U-shaped extrusion 104 has a downwardly open blind recess 108 with a closed top end 110 and an open bottom end 112. Each downwardly open blind recess 108 is dimensioned to receive one of the peripheral floor beams 20a for mounting such that top wall 48 of the peripheral floor beam 20a mounted therein is in abutment with the closed top end 110 and the bottom wall 50 of the peripheral floor beam 20a mounted therein slightly protrudes through the open bottom end 112. Each second U-shaped extrusion 106 has an upwardly open blind recess 114 with an open top end 116 and a closed bottom end 118. Each upwardly open blind recess 114 is dimensioned to receive one of the primary cross beams 20b for mounting such that the bottom wall 50 of the primary cross beam 20b mounted therein is in abutment with the closed bottom end 118 and the top wall 48 of the primary cross beam 20b mounted therein slightly protrudes through the open top end 116. In each intermediate connector 102, the downwardly open blind recess 108 is orthogonal to the upwardly open blind recess 114 such that the peripheral floor beam 20a mounted in the downwardly open blind recess 108 is angularly displaced from the primary cross beam 20b mounted in the upwardly open blind recess 114 by about 90 degrees.

As shown in FIGS. 23 and 24, the assembly 10 further comprises upright connectors 120 for connecting one of the uprights 22 and one of the peripheral floor beams 20a. Each upright connector 120 comprises a U-shaped extrusion 122 and an upright U-shaped extrusion 124. Each U-shaped extrusion 122 has a downwardly open blind recess 124 with a closed top end 126 and an open bottom end 128. Each downwardly open blind recess 124 is dimensioned to receive one the peripheral floor beams 20a for mounting such that the top wall 48 of the peripheral floor beam 20a mounted therein is in abutment with the closed top end 126. Each upright U-shaped extrusion 124 has a sideward open blind recess 130 with an open side 132 and a closed side 134. Each sideward open blind recess 130 is dimensioned to receive and mount an upright 22 therein such that the upright 22 mounted therein extends upwardly therefrom.

As shown in FIGS. 25 to 27, the assembly 10 further comprises a modular ladder 136. The modular ladder 136 is formed from a pair of extruded rectangular tubes 138 defining the braces, a pair of steps 140, a pair of ladder connectors 142 and a pair of step connectors 144. Each ladder connector 140 is configured to receive and mount one of the peripheral floor beams 20a, a top end of one of the extruded rectangular tubes 138 of the ladder 136 and an end of one of the steps 140. Each step connector 144 is configured to receive and mount one of the extruded rectangular tubes 138 and an end of one of the steps 140. It will be appreciated that the ladder connectors 140 and the step connectors will be formed from pieces of U-shaped extrusions similar to those described above in relation to the connectors 24a,b,c,d.

As shown in FIG. 1, the assembly 10 further comprises base connectors 146 for securing to the roof 12. As shown in FIG. 2, each base connector 146 has a L-bracket 148 and a U-shaped extrusion 150 welded to the L-bracket 148 such that the U-shaped extrusion 150 extends upwardly therefrom. Each U-shaped extrusion 150 has a sideward open blind recess 152 with an open top 154, an open side 156 and a closed side 158. The assembly 10 further comprises a pair of ladder base connectors 160. As shown in FIG. 3, each ladder base connector 160 is in form of a L-bracket.

As shown in FIGS. 29 and 30, the assembly 10 further comprises rectangular mesh plates 162 for forming a floor. As shown in FIGS. 33 to 37, the assembly 10 further comprises louver connectors 164, louvers 166 and corner louvers 168. It will be appreciated that the louver connectors 164, louvers 166 and corner louvers 168 are standard parts and will be known to a person skilled in the art.

A method of assembling/installing the assembly 10 will now be described.

Step 1: As shown in FIG. 1, the base connectors 146 are arranged on the roof 12 to define a substantially square area which is intended to be the periphery of the assembly 10. The base connectors 146 are then bolted through the L-brackets 148 onto the roof 12 for securement such that the sideward open blind recesses 152 are parallel with each other and the open sides 156 face towards the back 16 of the roof 12. The ladder base connectors 160 are arranged and bolted onto the roof slightly outside the intended periphery of the assembly 10 and between two base connectors 146 located at the front, right corner of the intended periphery of the assembly 10.

Step 2: As shown in FIG. 4, the bottom end 27 of each legs 18 is received and bolted into respective sideward open blind recesses 152 of the base connectors 146 such that the legs 18 extend vertically through the open tops 154 of the base connectors 146. Each leg 18 is then cut to modify their heights to accommodate for the pitch of the roof 12 such that the top ends 26 of the legs 18 are substantially planar and horizontally aligned. In this embodiment, the legs 18 are cut such that the legs 18 increase in height from the back 14 of the roof 12 to the front 13 of the roof 12. It will be appreciated that the cutting of the legs 18 may be done prior to the legs 18 being received and bolted into respective sideward open blind recesses 152 of the base connectors 146. It will also be appreciated that the legs 18, in other embodiments, will be cut at different heights depending on the pitch of the roof 12.

Step 3: As shown in FIG. 7, the corner connectors 24a, are mounted and bolted onto the legs 18 located at each corner of the intended periphery of the assembly 10. The corner connectors 24a, are orientated such that the first portion 70 of each corner connector 24a, is substantially aligned with the second portion 72 of another corner connector 24a.

Step 4: As shown in FIG. 9, the front-back side connectors 24b, are mounted and bolted onto the legs 18 located at the front and back of the intended periphery of the assembly 10. The front-back side connectors 24b, are orientated such that the further downwardly open blind recess 84 of each front-back side connector 24b, are substantially aligned with the front portion 70 of one corner connector 24a, and the second portion 72 of another corner connector 24a.

Step 5: As shown in FIG. 11, the standard connectors 24c are mounted and bolted onto the remaining legs 18 with the exception of one leg 18 located at the middle of the left side of the intended periphery of the assembly 10. The standard connectors 24c are orientated such that the upwardly open blind recesses 64 of the standard connectors 24c are substantially aligned and/or parallel with each other.

Step 6: As shown in FIG. 13, the standard-upright connector is mounted and bolted onto the remaining leg 18 located at the middle of the left side of the intended periphery of the assembly 10. The standard-upright connector is orientated such that the upwardly open blind recess 64 of the standard-upright connector is substantially aligned with the upwardly open blind recesses 64 of the standard connectors 24c located at the left side of the intended periphery of the assembly 10.

Step 7: As shown in FIG. 15, the peripheral floor beams 20a are mounted and bolted into the first and second portions 70, 72 of the corner connectors 24a, the further downwardly open recesses 84 of the front-back side connectors 24b, the upwardly open blind recess 64 of the standard-upright connector and the upwardly open blind recesses 64 of the standard connectors 24c located at the left and right sides of the intended periphery of the assembly 10.

Step 8: As shown in FIG. 17, the intermediate connectors 102 are mounted and bolted onto the peripheral floor beams 20a located at the front and back of the intended periphery of the assembly 10.

Step 9: As shown in FIG. 19, the primary cross floor beams 20b are mounted and bolted into the upwardly open blind recesses 114 of the intermediate connectors 102, the upwardly open blind recesses 64 of the front-back side connectors 24b, and the standard connectors 24c located within the intended periphery of the assembly 10. After the primary cross floor beams 20b are mounted and bolted, the primary floor beams 20b are substantially parallel with each other and equally spaced apart.

Step 10: As shown in FIG. 21, the secondary cross floor beams 20 are mounted and bolted onto the primary cross floor beams 20b and the peripheral floor beams 20a located at the left and right sides of the intended periphery of the assembly 10 such that parallel rows of the secondary cross floor beams 20c are formed that are equally spaced apart. After the secondary cross floor beams 20 are mounted and bolted, the top walls 48 of all the floor beams 20a,b,c are substantially planar and horizontal.

Step 11: As shown in FIG. 23, the upright connectors 120 are mounted on the peripheral floor beams 20a around the intended periphery of the assembly 10.

Step 12: As shown in FIG. 25, the modular ladder 136 is mounted and bolted onto the peripheral floor beam 20a located at the right side of the intended periphery of the assembly 10 by the ladder connectors 142. Also, bottom ends of the extruded rectangular tubes 138 of the modular ladder 136 are bolted onto respective ladder base connectors 160.

Step 13: As shown in FIG. 29, the mesh plates 162 are mounted bolted onto the top walls 48 of the floor beams 20a,b,c to define the floor.

Step 14: As shown in FIG. 31, the uprights 22 are mounted into the sideward open blind recesses 78 of the corner connector 24a, the sideward open blind recesses 90 of the front-back side connectors 24b, the sideward open blind recess 96 of the standard-upright connector and the sideward open blind recess 130 of the upright connectors 120. After the uprights 22 are mounted and bolted, the uprights 22 define an interior space of the assembly 10.

Step 15: As shown in FIG. 33, the louver connectors 164 are attached to outwardly facing walls 38 of the uprights 22. The louver connectors 164 are equally spaced apart on each upright 22.

Step 16: As shown in FIG. 35, the louvers 166 are attached to the louver connectors 164 to enclose the interior space of the assembly 10.

Step 17: As shown in FIG. 37, the corner louvers 168 are bolted to the louvers 166 at each corner to cover the gaps between the louvers 166. The assembly 10 is now fully assembled and installed.

Figure 38:
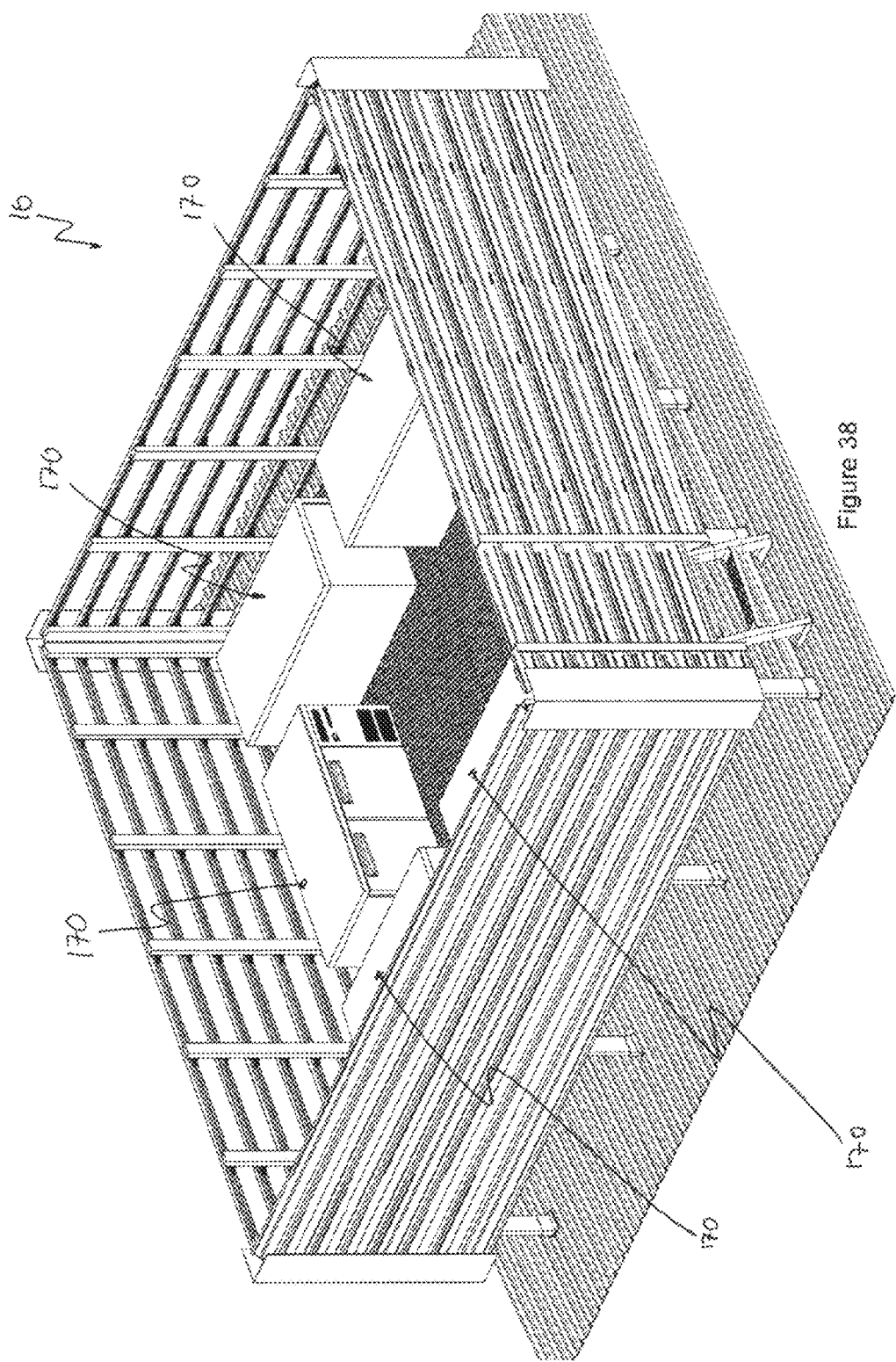
FIG. 38 is a perspective view of the assembly of FIG. 37 with air-conditioning equipment placed therein.

Step 18: As shown in FIG. 38, air-conditioning equipment 170 is placed on top of the mesh plates 162 within the interior space of the assembly 10.

An advantage of the assembly 10 is that the connectors 24a,b,c,d are self-supported on the legs 18 by gravity when mounted thereon, due to the legs 18 being mounted into the downwardly open blind recesses 59 of the connectors 24a, b,c,d. Further, the connectors 24a,b,c,d are able to support the floor beams 20a,b,c by gravity when the floor beams 20a,b,c are mounted therein, due to the floor beams 20a,b,c being mounted into the upwardly open blind recesses 64 of the connectors 24a,b,c,d. This allows the assembly 10 to be installed in an easy and quick manner as the connectors 24a,b,c,d and the floor beams 20a,b,c can be mounted into place without any immediate need for permanent securement (e.g. by bolting). Also, the supporting nature of the connectors 24a,b,c,d provides the assembly 10 with more structural rigidity.

Another advantage of the assembly 10 is that it can be easily adjusted to accommodate for any size, pitch, position, and load capacity. For example, adjustment to the height of the legs 18 can modify the pitch, and the rearrangement of the components of the assembly 10 described above can modify the shape. Also, for example, utilization of legs and floor beams with the same outer dimensions as those described above but with thicker walls can increase the load capacity.

Another advantage of the assembly 10 is that most components are made from similar shaped extrusions allowing for cost benefits and speed of manufacture. For example, the legs 18, the floor beams 20a,b,c and the uprights 22 are made from the same extruded rectangular tubes. Further, the connectors 24a,b,c,d, the intermediate connectors 102, and upright connectors 120 are made from the same U-shaped extrusions. Another advantage of the assembly 10 is that it is lightweight and does not create substantial loads on the roof 12 and therefore requires no heavy lifting equipment during installation. Another advantage of the assembly 10 is that sounds from the air-conditioning equipment 170 are substantially contained by the louvers 166.

Although the invention has been described with reference to a preferred embodiment, it will be appreciated by a person skilled in the art that the invention may be embodied in many other forms.

The invention claimed is:

1. A modular platform assembly, including:
   a plurality of legs;
   a plurality of floor beams; and
   a plurality of connectors for connecting the legs and the floor beams, each said connector comprising:
      a downwardly open blind recess with a closed top end and an open bottom end; and
      an upwardly open blind recess with a closed bottom end and an open top end,
   wherein the legs are mounted into the downwardly open blind recesses of the connectors and the floor beams are mounted into the upwardly open blind recesses of the connectors such that the legs extend downwardly from the floor beams, and wherein an outer cross sectional periphery of at least one of the legs is substantially the same as an outer cross sectional periphery of at least one of the floor beams, and wherein each said beam has a top surface, the closed top ends of the downwardly open blind recesses and the top surfaces of the beams together defining a plane.

2. The modular platform assembly according to claim 1, wherein each said leg is mounted into a respective downwardly open blind recess.

3. The modular platform assembly according to claim 1, wherein a first type of the connectors is a corner connector for connection at a corner of the assembly, the upwardly open blind recess of the corner connector has a first portion and a second portion, wherein one of the floor beams is mounted into the first portion and another of the floor beams is mounted into the second portion.

4. The modular platform assembly according to claim 3, wherein the first portion is arranged relative to the second portion such that the floor beam mounted into the first portion is angularly displaced from the floor beam mounted into the second portion.

5. The modular platform assembly according to claim 4, wherein the floor beam mounted into the first portion is angularly displaced from the floor beam mounted into the second portion by about 90 degrees.

6. The modular platform according to claim 3, wherein a second type of the connectors is a side connector for connection at a side of the assembly, wherein the side connector comprises a further downwardly open blind recess with a closed top end and an open bottom end, and wherein one of the floor beams is mounted into the upwardly open blind recess of the side connector and another of the floor beams is mounted into the further downwardly open blind recess of the side connector.

7. The modular platform according to claim 6, wherein the upwardly open blind recess of the side connector is arranged relative to the further downwardly open blind recess of the side connector such that the floor beam mounted into the upwardly open blind recess of the side connector is angularly displaced from the floor beam mounted into the further downwardly open blind recess of the side connector.

8. The modular platform according to claim 7, wherein the floor beam mounted into the upwardly open blind recess of the side connector is angularly displaced from the floor beam mounted into the further downwardly open blind recess of the side connector by about 90 degrees.

9. The modular platform assembly according to claim 1, further including an intermediate connector for connecting two of the floor beams, the intermediate connector comprising:
   a downwardly open blind recess with a closed top end and an open bottom end; and
   an upwardly open blind recess with a closed bottom end and an open top end, wherein one of the floor beams is mounted into the downwardly open blind recess of the intermediate connector and another of the floor beams is mounted into the upwardly open blind recess of the intermediate connector.

10. The modular platform assembly according to claim 9, wherein the downwardly open blind recess of the intermediate connector is arranged relative to the upwardly open blind recess of the intermediate connector such that the floor beam mounted into the downwardly open blind recess of the intermediate connector is angularly displaced from the floor beam mounted into the upwardly open blind recess of the intermediate connector.

11. The modular platform assembly according to claim 10, wherein the floor beam mounted into the downwardly open blind recess of the intermediate connector is angularly displaced from the floor beam mounted into the upwardly open blind recess of the intermediate connector by about 90 degrees.

12. The modular platform assembly according to claim 1, further including a plurality of uprights, each said upright extending upwardly from a respective connector located at the periphery of the assembly such that the uprights define an interior.

13. The modular platform assembly according to claim 1, further including a plurality of base connectors for securing to a base, wherein the legs are mounted onto the base connectors such that the legs extend upwardly therefrom.

14. The modular platform assembly according to claim 1, further including one or more mesh plates mounted on top of the floor beams to define a floor.

15. A method of assembling a modular platform, the method comprising the steps of:
   arranging a plurality of legs into at least an intended periphery of the platform;
   mounting the legs into downwardly open blind recesses of a plurality of connectors, each said downwardly open blind recess having a closed top end and an open bottom end; and
   mounting a plurality of floor beams into upwardly open recesses of the connectors such that the legs extend downwardly from the floor beams, each said upwardly open recess having a closed bottom end and an open top end, and wherein an outer cross sectional periphery of at least one of the legs is substantially the same as an outer cross sectional periphery of at least one of the floor beams, and wherein each said beam has a top surface, the closed top ends of the downwardly open blind recesses and the top surfaces of the beams together defining a plane.

16. The method according to claim 15, wherein the step of mounting the legs into downwardly open blind recesses comprises mounting each said leg into a respective downwardly open blind recess.

17. The method according to claim 15, wherein a first type of the connectors is a corner connector for connection at a corner of the assembly, the upwardly open blind recess of the corner connector has a first portion and a second portion, wherein the step of mounting the floor beams into upwardly open recesses of the connectors comprises mounting one of the floor beams into the first portion and mounting another of the floor beams into the second portion.

18. The method according to claim 17, wherein the first portion is arranged relative to the second portion such that the floor beams mounted into the first portion is angularly displaced from the floor beam mounted into the second portion.

* * * * *